US012367824B2

(12) United States Patent
Lee et al.

(10) Patent No.: US 12,367,824 B2
(45) Date of Patent: Jul. 22, 2025

(54) DISPLAY DEVICE, OPERATING METHOD OF DISPLAY DEVICE AND PIXEL CHARACTERISTIC DETECTION METHOD

(71) Applicant: Samsung Display Co., Ltd., Yongin-Si (KR)

(72) Inventors: Jaehoon Lee, Yongin-si (KR); Taehyeong An, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/125,855

(22) Filed: Mar. 24, 2023

(65) Prior Publication Data

US 2023/0368732 A1 Nov. 16, 2023

(30) Foreign Application Priority Data

May 12, 2022 (KR) ........................ 10-2022-0058588

(51) Int. Cl.
*G09G 3/3233* (2016.01)
*G09G 3/20* (2006.01)

(52) U.S. Cl.
CPC ......... *G09G 3/3233* (2013.01); *G09G 3/2007* (2013.01); *G09G 3/2096* (2013.01); *G09G 2300/0413* (2013.01); *G09G 2300/0819* (2013.01); *G09G 2300/0842* (2013.01); *G09G 2300/0866* (2013.01); *G09G 2310/08* (2013.01);

(Continued)

(58) Field of Classification Search
CPC .. G09G 3/3233; G09G 3/2007; G09G 3/2096; G09G 2300/0413; G09G 2300/0819; G09G 2300/0842; G09G 2300/0866; G09G 2310/08; G09G 2320/043; G09G 2360/16

See application file for complete search history.

(56) References Cited

U.S. PATENT DOCUMENTS 6,005,543 A * 12/1999 Kimura ................ G09G 3/3648 345/94
8,432,337 B2 * 4/2013 You ...................... G09G 3/3406 313/484

(Continued)

FOREIGN PATENT DOCUMENTS

KR 10-2017-0078921 A 7/2017
KR 10-2373691 B1 3/2022

*Primary Examiner* — Michael J Jansen, II

(74) *Attorney, Agent, or Firm* — Innovation Counsel LLP

(57) ABSTRACT

A display device is disclosed that includes a display panel which includes a pixel, a driving controller which receives an input image signal and outputs an output image signal, and a data driving circuit which provides a data signal corresponding to the output image signal to the pixel. The pixel includes a light emitting device and a first transistor electrically connected to the light emitting device. The driving controller includes an initial threshold voltage map that stores an initial threshold voltage of the first transistor, a delta threshold voltage calculator that calculates a delta threshold voltage of the first transistor over an operating time based on the initial threshold voltage, a weight calculator that calculates a weight based on the initial threshold voltage and the delta threshold voltage, and a compensator that receives the input image signal and outputs an output image signal obtained by compensating for a threshold voltage of the first transistor based on the weight.

17 Claims, 21 Drawing Sheets

(52) U.S. Cl.
CPC ... *G09G 2320/043* (2013.01); *G09G 2360/16* (2013.01)

(56) References Cited

U.S. PATENT DOCUMENTS

| | | | | |
|---|---|---|---|---|
| 8,686,925 | B2 * | 4/2014 | Chung | G09G 3/3291 345/76 |
| 9,135,854 | B2 * | 9/2015 | Chung | G09G 3/3291 |
| 9,311,857 | B2 * | 4/2016 | Seong | G09G 3/3225 |
| 10,152,920 | B2 * | 12/2018 | Lee | H10K 59/123 |
| 10,777,128 | B2 * | 9/2020 | Feng | H10K 10/482 |
| 10,825,385 | B2 * | 11/2020 | Wang | G09G 3/3233 |
| 10,971,065 | B2 * | 4/2021 | Hong | G09G 3/3233 |
| 11,710,449 | B2 * | 7/2023 | Kim | G09G 3/2096 345/204 |
| 11,854,497 | B2 * | 12/2023 | Chang | G06N 3/08 |
| 2008/0284691 | A1 * | 11/2008 | Chung | G09G 3/3225 345/76 |
| 2011/0181627 | A1 * | 7/2011 | You | G09G 3/3406 345/690 |
| 2014/0111566 | A1 * | 4/2014 | Chung | G09G 3/3291 345/82 |
| 2014/0152717 | A1 * | 6/2014 | Seong | G09G 3/3225 345/76 |
| 2017/0294159 | A1 * | 10/2017 | Lee | H10K 59/123 |
| 2018/0082634 | A1 * | 3/2018 | Wang | G09G 3/3233 |
| 2019/0164476 | A1 * | 5/2019 | Feng | G09G 3/3225 |
| 2021/0065623 | A1 * | 3/2021 | Hong | G09G 3/3275 |
| 2023/0048619 | A1 * | 2/2023 | Kim | G09G 3/32 |
| 2023/0252946 | A1 * | 8/2023 | Chang | G09G 3/3291 345/204 |
| 2023/0368732 | A1 * | 11/2023 | Lee | G09G 3/2007 |

* cited by examiner

DISPLAY DEVICE, OPERATING METHOD OF DISPLAY DEVICE AND PIXEL CHARACTERISTIC DETECTION METHOD

CROSS-REFERENCE TO RELATED APPLICATIONS

This application claims priority under 35 U.S.C. § 119 to Korean Patent Application No. 10-2022-0058588 filed on May 12, 2022, in the Korean Intellectual Property Office, the disclosures of which are incorporated by reference herein in their entireties.

BACKGROUND

The present disclosure relates to a display device.

Electronic devices such as a smart phone, a digital camera, a notebook computer, a navigation device, a smart television, and the like that provides images to a user include a display device for displaying images. The display device generates an image and then provides the user with the generated image through a display screen.

The display device includes a plurality of pixels and a plurality of driving circuits for controlling the plurality of pixels. Each of the plurality of pixels includes a light emitting device and a pixel circuit for controlling the light emitting device. The driving circuit of the pixel may include a plurality of transistors organically connected with each other.

The display device may apply a data signal to a display panel and may display an image as a current corresponding to the data signal is supplied to the light emitting device.

Characteristics of the transistors constituting the pixel may change when they are operated for a long time.

SUMMARY

Embodiments of the present disclosure provide a display device capable of compensating for a change in a pixel characteristic and an operating method thereof.

Embodiments of the present disclosure provide a method capable of detecting a pixel characteristic.

According to an embodiment of the present disclosure, a display device includes a display panel including a pixel, a driving controller configured to receive an input image signal and output an output image signal, and a data driving circuit configured to provide a data signal corresponding to the output image signal to the pixel. The pixel includes a light emitting device and a first transistor electrically connected to the light emitting device, and the driving controller includes an initial threshold voltage map configured to store an initial threshold voltage of the first transistor, a delta threshold voltage calculator configured to calculate a delta threshold voltage of the first transistor over an operating time based on the initial threshold voltage, a weight calculator configured to calculate a weight based on the initial threshold voltage and the delta threshold voltage, and a compensator configured to receive the input image signal and output the output image signal obtained by compensating for a threshold voltage of the first transistor based on the weight.

According to an embodiment, the display panel may further include a dummy pixel, and the driving circuit may further include a feedback threshold voltage calculator configured to receive a sensing signal from the dummy pixel and calculate a feedback threshold voltage based on the sensing signal.

According to an embodiment, the delta threshold voltage calculator is configured to calculate the delta threshold voltage based on the initial threshold voltage and the feedback threshold voltage.

According to an embodiment, the feedback threshold voltage calculator may periodically receive the sensing signal from the dummy pixel, and the delta threshold voltage calculator may periodically calculate the delta threshold voltage based on the initial threshold voltage and the feedback threshold voltage.

According to an embodiment, the display panel may include a display area in which the pixel is disposed and a non-display area in which the dummy pixel is disposed.

According to an embodiment, the initial threshold voltage of the first transistor may be based on a voltage level of a second electrode of the first transistor when the data signal is provided to a gate electrode of the first transistor and a first driving voltage is provided to a first electrode of the first transistor.

According to an embodiment, the initial threshold voltage of the first transistor may be based on a first luminance of the pixel when the data signal corresponding to a first grayscale is provided to the pixel, and based on a second luminance of the pixel when the data signal corresponding to a second grayscale different from the first grayscale is provided to the pixel.

According to an embodiment, the initial threshold voltage of the first transistor may be calculated based on Equation.

$$\frac{La}{Lb} = \frac{\eta_a \times I_a}{\eta_b \times I_b} = \frac{(a\text{V}data - \text{V}INT - \text{V}kb - \text{V}th)^2}{(b\text{V}data - \text{V}INT - \text{V}kb - \text{V}th)^2}$$

Wherein La denotes the first luminance of an image corresponding to the first grayscale, $\eta_a$ denotes a first luminous efficacy of the pixel corresponding to the first grayscale, and Ia denotes a current flowing through the light emitting device corresponding to the first grayscale, aVdata denotes a voltage of the data signal corresponding to the first grayscale, Lb denotes the second luminance of the image corresponding to the second grayscale, $\eta_b$ denotes a second luminous efficacy of the image corresponding to the second grayscale, Ib denotes a current flowing through the light emitting device corresponding to the second grayscale, bVdata denotes a voltage of the data signal corresponding to the second grayscale, VINT denotes an initialization voltage for initializing the light emitting device, Vkb denotes a kickback voltage depending on a position of the pixel, and Vth denotes the initial threshold voltage of the first transistor.

According to an embodiment, the first grayscale and the second grayscale may be selected from among a plurality of grayscales such that the first luminous efficacy and the second luminous efficacy are substantially the same.

According to an embodiment, the pixel may further include a second transistor connected between a data line and a gate electrode of the first transistor, a third transistor connected between a first driving voltage line and a first electrode of the first transistor, a capacitor having a first electrode connected to the gate electrode of the first transistor and a second electrode connected to a second electrode of the first transistor, and a fourth transistor connected between the second electrode of the capacitor and a second driving voltage line.

According to an embodiment, when the second transistor, the third transistor, and the fourth transistor are all turned on and the data signal is provided through the data line, the initial threshold voltage of the first transistor may be detected based on the voltage of the second driving voltage line.

According to an embodiment, the pixel may further include a second transistor connected between a gate electrode of the first transistor and an initialization voltage line, a third transistor connected between an anode of the light emitting device and the initialization voltage line, a fourth transistor connected between a first driving voltage line and a first electrode of the first transistor, and a fifth transistor connected between the second electrode of the first transistor and the anode of the light emitting device.

According to an embodiment, in a first period, when the second transistor is turned on, a initialization voltage from the initialization voltage line may be provided to the gate electrode of the first transistor, in a second period, when the third transistor is turned on, the initialization voltage from the initialization voltage line may be provided to the anode of the light emitting device, and in a third period, when the fourth transistor and the fifth transistor are turned on, a current may be provided to the light emitting device.

According to an embodiment, the initial threshold voltage of the first transistor may be based on a luminance of the pixel in the third period.

According to an embodiment of the present disclosure, a method of operating the display device includes calculating a delta threshold voltage of a first transistor based on an initial threshold voltage and an operating time of the first transistor in a pixel, calculating a weight based on the initial threshold voltage and the delta threshold voltage, and receiving an input image signal and outputting an output image signal obtained by compensating for a threshold voltage of the first transistor based on the weight.

According to an embodiment, the method of operating the display device may further include receiving a sensing signal from a dummy pixel and calculating a feedback threshold voltage based on the sensing signal.

According to an embodiment, the calculating of the delta threshold voltage may include calculating the delta threshold voltage based on the initial threshold voltage and the feedback threshold voltage.

According to an embodiment, the initial threshold voltage of the first transistor may be based on a voltage level of a second electrode of the first transistor when a data signal is provided to a gate electrode of the first transistor and a first driving voltage is provided to a first electrode of the first transistor.

According to an embodiment, the initial threshold voltage of the first transistor may be based on a first luminance of the pixel when the data signal corresponding to a first grayscale is provided to the pixel, and based on a second luminance of the pixel when the data signal corresponding to a second grayscale is provided to the pixel.

According to an embodiment of the present disclosure, a method of detecting a pixel characteristic includes providing a data signal of a first grayscale to a pixel, obtaining a first luminance of the pixel, providing the data signal of a second grayscale different from the first grayscale to the pixel, obtaining a second luminance of the pixel, and calculating an initial threshold voltage of the first transistor in the pixel based on the first luminance and the second luminance.

According to an embodiment, the pixel may further include a light emitting device electrically connected to the first transistor, and the initial threshold voltage of the first transistor may be calculated based on Equation.

$$\frac{La}{Lb} = \frac{\eta_a \times I_a}{\eta_b \times I_b} = \frac{(a\mathrm{V}data - \mathrm{V}INT - \mathrm{V}kb - \mathrm{V}th)^2}{(b\mathrm{V}data - \mathrm{V}INT - \mathrm{V}kb - \mathrm{V}th)^2}$$

Wherein La denotes the first luminance of an image corresponding to the first grayscale, $\eta_a$ denotes a first luminous efficacy of the pixel corresponding to the first grayscale, and Ia denotes a current flowing through the light emitting device corresponding to the first grayscale, aVdata denotes a voltage of the data signal corresponding to the first grayscale, Lb denotes the second luminance of the image corresponding to the second grayscale, $\eta_b$ denotes a second luminous efficacy of the image corresponding to the second grayscale, Ib denotes a current flowing through the light emitting device corresponding to the second grayscale, bVdata denotes a voltage of the data signal corresponding to the second grayscale, VINT denotes an initialization voltage for initializing the light emitting device, Vkb denotes a kickback voltage depending on a position of the pixel, and Vth denotes the initial threshold voltage of the pixel.

According to an embodiment, the first grayscale and the second grayscale may be selected from among a plurality of grayscales such that the first luminous efficacy and the second luminous efficacy are substantially the same.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
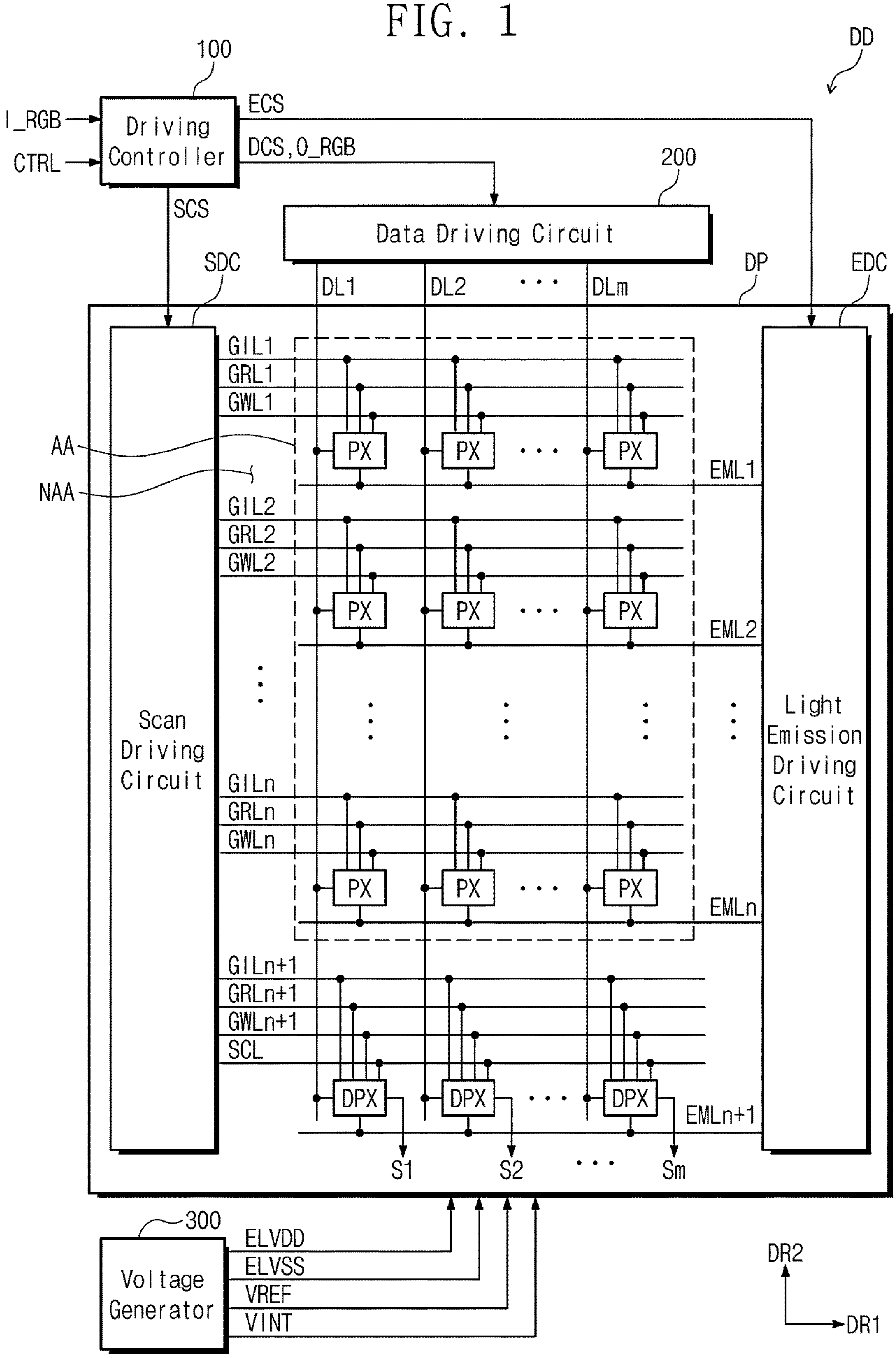
FIG. 1 is a block diagram of a display device, according to an embodiment of the present disclosure.

In the specification, when one component (or area, layer, part, or the like) is referred to as being "on", "connected to", or "coupled to" another component, it should be understood that the former may be directly on, connected to, or coupled to the latter, and also may be on, connected to, or coupled to the latter via a third intervening component.

Like reference numerals refer to like components. Also, in drawings, the thickness, ratio, and dimension of components are exaggerated for effectiveness of description of technical contents.

As used herein, the word "or" means logical "or" so that, unless the context indicates otherwise, the expression "A, B, or C" means "A and B and C," "A and B but not C," "A and C but not B," "B and C but not A," "A but not B and not C," "B but not A and not C," and "C but not A and not B."

The terms "first", "second", etc. are used to describe various components, but the components are not limited by the terms. The terms are used only to differentiate one component from another component. For example, a first component may be named as a second component, and vice versa, without departing from the spirit or scope of the present disclosure. A singular form, unless otherwise stated, includes a plural form.

Also, the terms "under", "beneath", "on", "above" are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless defined otherwise, all terms (including technical and scientific terms) used herein have the same meaning as commonly understood by one of ordinary skill in the art to which this disclosure belongs. In addition, terms such as terms defined in commonly used dictionaries should be interpreted as having a meaning consistent with the meaning in the context of the related technology, and should not be interpreted as an ideal or excessively formal meaning unless explicitly defined in the present disclosure.

Hereinafter, embodiments of the present disclosure will be described with reference to accompanying drawings.

FIG. 1 is a block diagram of a display device, according to an embodiment of the present disclosure.

Referring to FIG. 1, a display device DD includes a display panel DP, a driving controller 100, a data driving circuit 200, and a voltage generator 300.

The driving controller 100 receives an input image signal I_RGB and a control signal CTRL. The driving controller 100 generates an output image signal O_RGB obtained by converting a data format of the input image signal I_RGB to be suitable for the display panel DP. The driving controller 100 outputs a scan control signal SCS, an emission control signal ECS, and a data control signal DCS.

The data driving circuit 200 receives the data control signal DCS and the output image signal O_RGB from the driving controller 100. The data driving circuit 200 converts the output image signal O_RGB into data signals and outputs the data signals to a plurality of data lines DL1 to DLm to be described later. The data signals refer to analog voltages corresponding to a grayscale level of the output image signal O_RGB.

The voltage generator 300 generates voltages necessary for an operation of the display panel DP. In an embodiment, the voltage generator 300 generates a first driving voltage ELVDD, a second driving voltage ELVSS, a first initialization voltage VREF, and a second initialization voltage VINT.

The display panel DP includes scan lines GIL1 to GILn+1, GRL1 to GRLn+1, and GWL1 to GWLn+1, emission lines EML1 to EMLn+1, the data lines DL1 to DLm, pixels PX, and dummy pixels DPX. The display panel DP may further include a scan driving circuit SDC and a light emission driving circuit EDC.

In an embodiment, the pixels PX may be arranged in a display area AA, and the dummy pixels DPX, the scan driving circuit SDC, and the light emission driving circuit EDC may be arranged in a non-display area NAA.

In an embodiment, the scan driving circuit SDC is arranged at a first side of the non-display area NAA in the display panel DP. The scan lines GIL1 to GILn+1, GRL1 to GRLn+1, and GWL1 to GWLn+1 extend from the scan driving circuit SDC in a first direction DR1.

The light emission driving circuit EDC is arranged on a second side of the non-display area NAA in the display panel DP. The emission lines EML1 to EMLn extend from the light emission driving circuit EDC in a direction opposite to the first direction DR1.

The scan lines GIL1 to GILn+1, GRL1 to GRLn+1, and GWL1 to GWLn+1 and the emission lines EML1 to EMLn are arranged to be spaced from each other in a second direction DR2. The data lines DL1 to DLm extend from the data driving circuit 200 in a direction opposite to the second direction DR2, and are arranged to be spaced apart from one another in the first direction DR1.

In an example illustrated in FIG. 1, the scan driving circuit SDC and the light emission driving circuit EDC are arranged facing each other with the pixels PX interposed therebetween, but the present disclosure is not limited thereto. For example, the scan driving circuit SDC and the light emission driving circuit EDC may be disposed adjacent to each other on one of the first side and the second side of the display panel DP. In an embodiment, the scan driving circuit SDC and the light emission driving circuit EDC may be implemented with one circuit.

Each of the plurality of pixels PX may be electrically connected to three scan lines and one emission line. For example, as illustrated in FIG. 1, the pixels PX in a first row may be connected to the scan lines GIL1, GRL1, and GWL1 and the emission line EML1. In addition, the pixels in a second row may be connected to the scan lines GIL2, GRL2, and GWL2 and the emission line EML2.

Each of the plurality of pixels PX includes a light emitting device ED (refer to FIG. 2) and a pixel circuit PXC (refer to FIG. 2) for controlling the light emission of the light emitting device ED. The pixel circuit PXC may include one or more transistors and one or more capacitors. The scan driving circuit SDC and the light emission driving circuit EDC may include transistors formed through the same process as the pixel circuit PXC.

Each of the plurality of pixels PX receives the first driving voltage ELVDD, the second driving voltage ELVSS, the first initialization voltage VREF, and the second initialization voltage VINT from the voltage generator 300.

Each of the plurality of dummy pixels DPX may be electrically connected to three scan lines, one sensing line, and one emission line. For example, as illustrated in FIG. 1, the dummy pixels DPX may be connected to the scan lines GILn+1, GRLn+1, and GWLn+1, the sensing control line SCL, and the emission line EMLn+1.

The plurality of dummy pixels DPX illustrated in FIG. 1 are disposed in the non-display area NAA adjacent to the pixels PX in an n-th row, but the present disclosure is not limited thereto. In an embodiment, the plurality of dummy pixels DPX may be disposed in the non-display area NAA adjacent to the pixels PX in a first row.

Each of the plurality of dummy pixels DPX may receive the first driving voltage ELVDD, the second driving voltage ELVSS, the first initialization voltage VREF, and the second initialization voltage VINT from the voltage generator 300. The plurality of dummy pixels DPX may output sensing signals S1 to Sm.

The scan driving circuit SDC receives the scan control signal SCS from the driving controller 100. The scan driving circuit SDC may output scan signals to the scan lines GIL1 to GILn+1, GRL1 to GRLn+1, and GWL1 to GWLn+1 in response to the scan control signal SCS.

In an embodiment, the scan driving circuit SDC may output a sensing signal to the sensing control line SCL in response to the scan control signal SCS output from the driving controller 100. In an embodiment, the scan driving circuit SDC may not output the sensing signal to the sensing control line SCL. Instead, the driving controller 100 may directly output the sensing signal to the sensing control line SCL. In an embodiment, the data driving circuit 200 may output the sensing signal to the sensing control line SCL.

The light emission driving circuit EDC receives the emission control signal ECS from the driving controller 100. The light emission driving circuit EDC may output emission signals to the emission lines EML1 to EMLn+1 in response to the emission control signal ECS.

Figure 2:
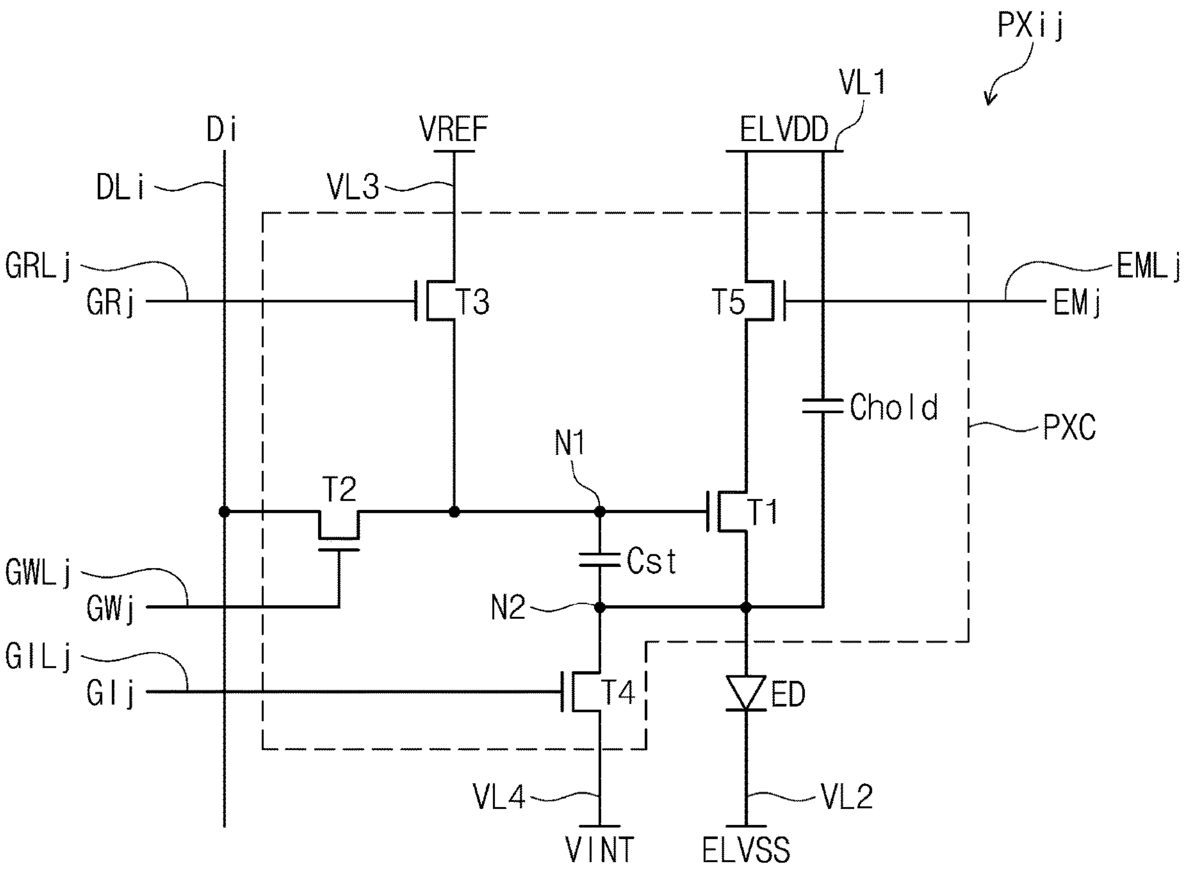
FIG. 2 is a circuit diagram of a pixel, according to an embodiment of the present disclosure.

FIG. 2 is a circuit diagram of a pixel, according to an embodiment of the present disclosure.

In FIG. 2, there is illustrated a pixel PXij that is connected with the i-th data line DLi of the data lines DL1 to DLm, the j-th scan lines GILj, GRLj, and GWLj of the scan lines GIL1 to GILn+1, GRL1 to GRLn+1, and GWL1 to GWLn+1, and the j-th emission line EMLj of the emission lines EML1 to EMLn+1, which are illustrated in FIG. 1, as an example.

Each of the plurality of pixels PX illustrated in FIG. 1 may have the same circuit configuration as the pixel PXij illustrated in FIG. 2.

Referring to FIG. 2, the pixel PXij according to an embodiment includes the pixel circuit PXC and at least one light emitting device ED. The pixel circuit PXC includes first to fifth transistors T1 T2, T3, T4, and T5, a first capacitor Cst, and a second capacitor Chold. In an embodiment, the light emitting device ED may be a light emitting diode. In an embodiment, it is described that the one pixel PXij includes one light emitting device ED.

In an embodiment, each of the first to fifth transistors T1 to T5 may be an N-type transistor using an oxide semiconductor as a semiconductor layer. However, the present disclosure is not limited thereto. In an embodiment, each of the first to fifth transistors T1 to T5 may be a P-type transistor having a low-temperature polycrystalline silicon (LTPS) semiconductor layer. In an embodiment, at least one of the first to fifth transistors T1 to T5 may be an N-type transistor, and the remaining transistors may be P-type transistors. In addition, the circuit configuration of the pixel according to the present disclosure is not limited to FIG. 2. The pixel circuit PXC illustrated in FIG. 2 is only an example. For example, the configuration of the pixel circuit PXC may be modified and implemented.

The scan lines GILj, GRLj, and GWLj may transfer scan signals GIj, GRj, and Gwj, respectively, and the emission line EMLj may transfer an emission signal EMj. The data line DLi transfers a data signal Di. The data signal Di may have a voltage level corresponding to the output image signal O_RGB that is output from the driving controller 100 (refer to FIG. 1). First to fourth driving voltage lines VL1, VL2, VL3, and VL4 may transfer the first driving voltage ELVDD, the second driving voltage ELVSS, the first initialization voltage VREF, and the second initialization voltage VINT, respectively.

The first capacitor Cst is connected between a first node N1 and a second node N2. The second capacitor Chold may connected between the first driving voltage line VL1 and the second node N2.

The first transistor T1 includes a first electrode connected to the first driving voltage line VL1 through the fifth transistor T5, a second electrode electrically connected to an anode of the light emitting device ED, and a gate electrode connected to the first node N1.

The second transistor T2 includes a first electrode connected to the data line DLi, a second electrode connected to the first node N1, and a gate electrode connected to the scan line GWLj. The second transistor T2 may be turned on depending on the scan signal GWj received through the scan line GWLj and then may transfer the data signal Di transferred from the data line DLi to the first node N1.

The third transistor T3 includes a first electrode connected to the third driving voltage line VL3, a second electrode connected to the first node N1, that is, the gate electrode of the first transistor T1, and a gate electrode connected to the scan line GRLj. The third transistor T3 may be turned on depending on the scan signal GRj received through the scan line GRLj and then may transfer the first initialization voltage VREF to the gate electrode of the first transistor T1.

The fourth transistor T4 includes a first electrode connected to the second node N2, a second electrode connected to the fourth driving voltage line VL4, and a gate electrode connected to the scan line GILj. The fourth transistor T4 may be turned on depending on the scan signal GIj received through the scan line GILj, and then may transfer the second initialization voltage VINT to the second node N2.

The fifth transistor T5 includes a first electrode connected to the first driving voltage line VL1, a second electrode connected to the first electrode of the first transistor T1, and a gate electrode connected to the emission line EMLj. The fifth transistor T5 is turned on depending on the emission signal EMj received through the emission line EMLj to electrically connect the first driving voltage line VL1 to the first electrode of the first transistor T1.

Figure 3:
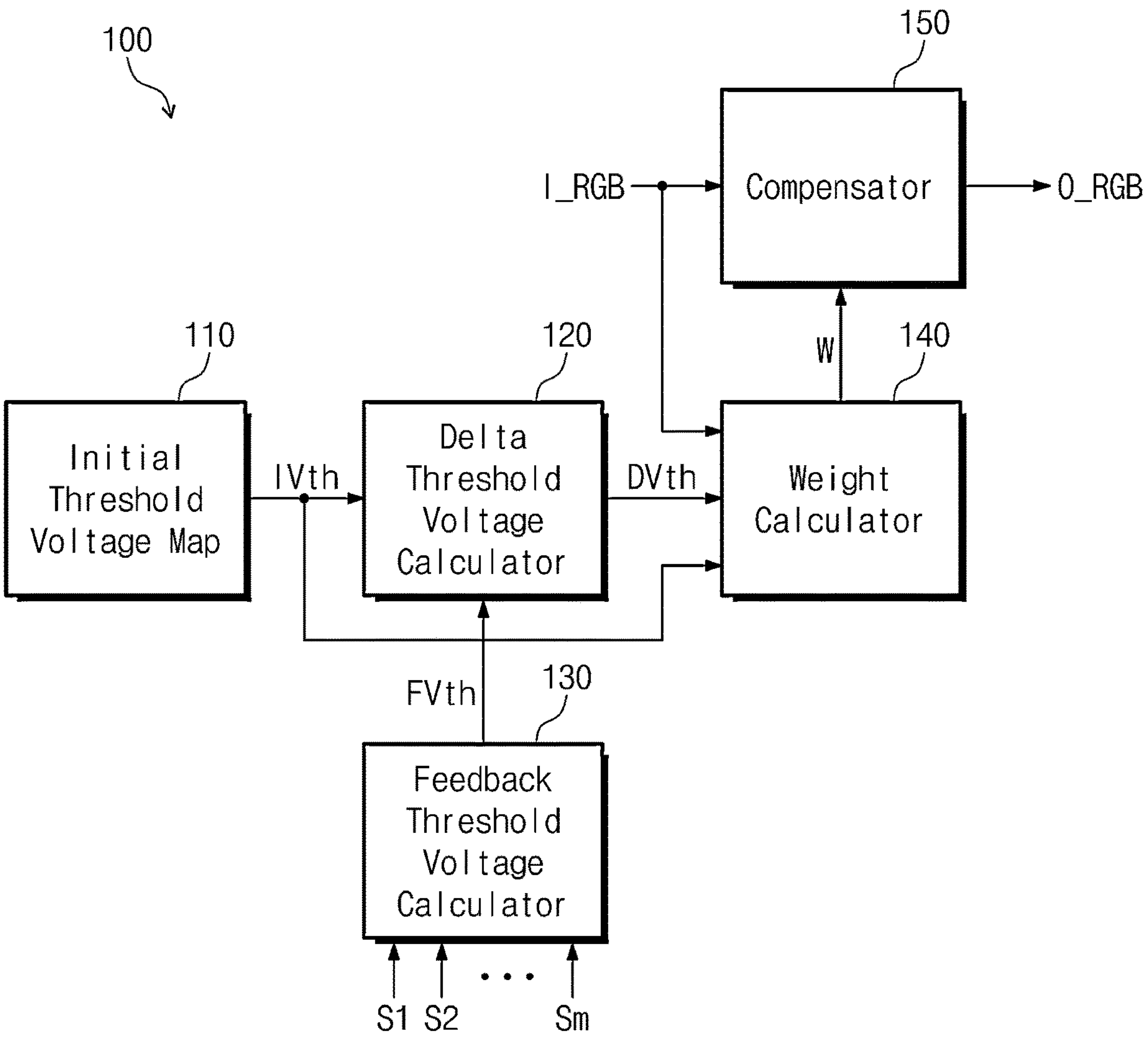
FIG. 3 is a block diagram illustrating a configuration of a driving controller, according to an embodiment of the present disclosure.

FIG. 3 is a block diagram illustrating a configuration of a driving controller, according to an embodiment of the present disclosure.

Referring to FIG. 3, the driving controller 100 includes an initial threshold voltage map 110, a delta threshold voltage calculator 120, a feedback threshold voltage calculator 130, a weight calculator 140, and a compensator 150.

In an embodiment illustrated in FIG. 2, the first transistor T1 is an N-type transistor using an oxide semiconductor as a semiconductor layer. Threshold voltages of the first transistors T1 of each of the pixels PX illustrated in FIG. 1 may be different from one another due to a process deviation. Also, when the operating time of the display device DD is increased, the threshold voltage of the first transistor T1 may vary depending on the initial threshold voltage level of the first transistor T1. For example, it is assumed that the threshold voltage of the first transistor T1 in a first pixel of the pixels PX is A volts (V), and the threshold voltage of the first transistor T1 in a second pixel of the pixels PX is B volts (V) greater than the A volts (V). When the operating time of the display device DD is 300 hours, the threshold voltage of the first transistor T1 in the first pixel may be A+a volts (V), and the threshold voltage of the first transistor T1 in the second pixel may be B+b volts (V). In this case, the threshold voltage variation 'a' of the first transistor T1 in the first pixel may be different from the threshold voltage variation 'b' of the first transistor T1 in the second pixel.

According to an embodiment, to display an image in which the first pixel and the second pixel have the same luminance, it is necessary to know the initial threshold voltage of the first transistor T1 in the first pixel and the initial threshold voltage of the first transistor T1 in the second pixel. In addition, according to an embodiment, it is necessary to know a delta threshold voltage of the first transistor T1 in the first pixel and a delta threshold voltage of the first transistor T1 in the second pixel.

The delta threshold voltage of the first transistor T1 in the first pixel is a threshold change amount (a difference between an initial threshold and a current threshold) of the first transistor T1 in the first pixel over the operating time period. The delta threshold voltage of the first transistor T1 in the second pixel is a threshold change amount (a difference between an initial threshold and a current threshold) of the first transistor T1 in the second pixel over the operating time period.

The driving controller 100 calculates a weight W based on the initial threshold voltage map 110 in which the initial threshold voltage of the first transistor T1 in the pixels PX is stored and a delta threshold voltage DVth from the delta threshold voltage calculator 120 storing the delta threshold voltage, compensates for the input image signal I_RGB based on the weight W, and outputs the output image signal O_RGB.

Figure 4:
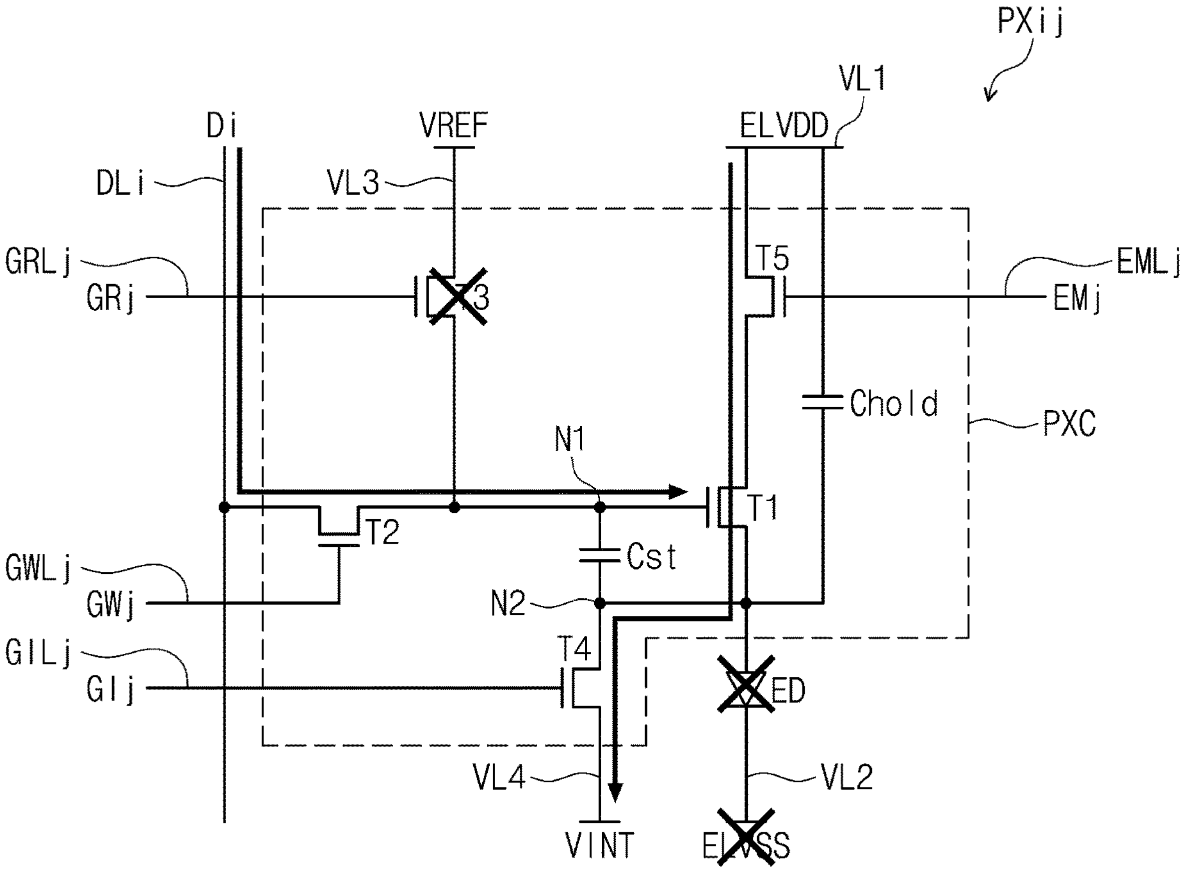
FIG. 4 is a diagram for describing a method according to a first embodiment for detecting an initial threshold voltage of a first transistor in a pixel.

FIG. 4 is a diagram for describing a method according to a first embodiment for detecting an initial threshold voltage of a first transistor in a pixel.

Referring to FIG. 4, during a detection mode for detecting the initial threshold voltage of the first transistor T1 in the pixel PXij, the scan signal GRj is at an inactive level (e.g., a low level), and the second driving voltage ELVSS and the second initialization voltage VINT are not supplied. Accordingly, the third transistor T3 is in a turned off state.

Although FIG. 4 illustrates that the second driving voltage ELVSS is not supplied during the detection mode in which the initial threshold voltage of the first transistor T1 is detected, the present disclosure is not limited thereto. In an embodiment, a voltage level of the second driving voltage ELVSS may be increased to a specified level such that a current does not flow to the light emitting device ED during the detection mode.

In addition, during the detection mode, the scan signals GWj and GIj and the emission signal EMj are at an active level (e.g., a high level). Accordingly, the first, second, fourth, and fifth transistors T1, T2, T4, and T5 are in a turned on state. Therefore, a current corresponding to the data signal Di provided through the data line DLi flows through the fourth driving voltage line VL4, the first driving voltage line VL1, the fifth transistor T5, the first transistor T1, and the fourth transistor T4.

In an embodiment, in a production stage of the display device DD (refer to FIG. 1), a test device senses the voltage level of the fourth driving voltage line VL4 during the detection mode to detect the initial threshold voltage of the first transistor T1.

The threshold voltage of the first transistor T1 may be stored in the initial threshold voltage map 110 illustrated in FIG. 3. In an embodiment, the initial threshold voltage of the first transistor T1 of each of all the pixels PX arranged in the display area AA of the display panel DP may be stored in the initial threshold voltage map 110.

Figure 5A:
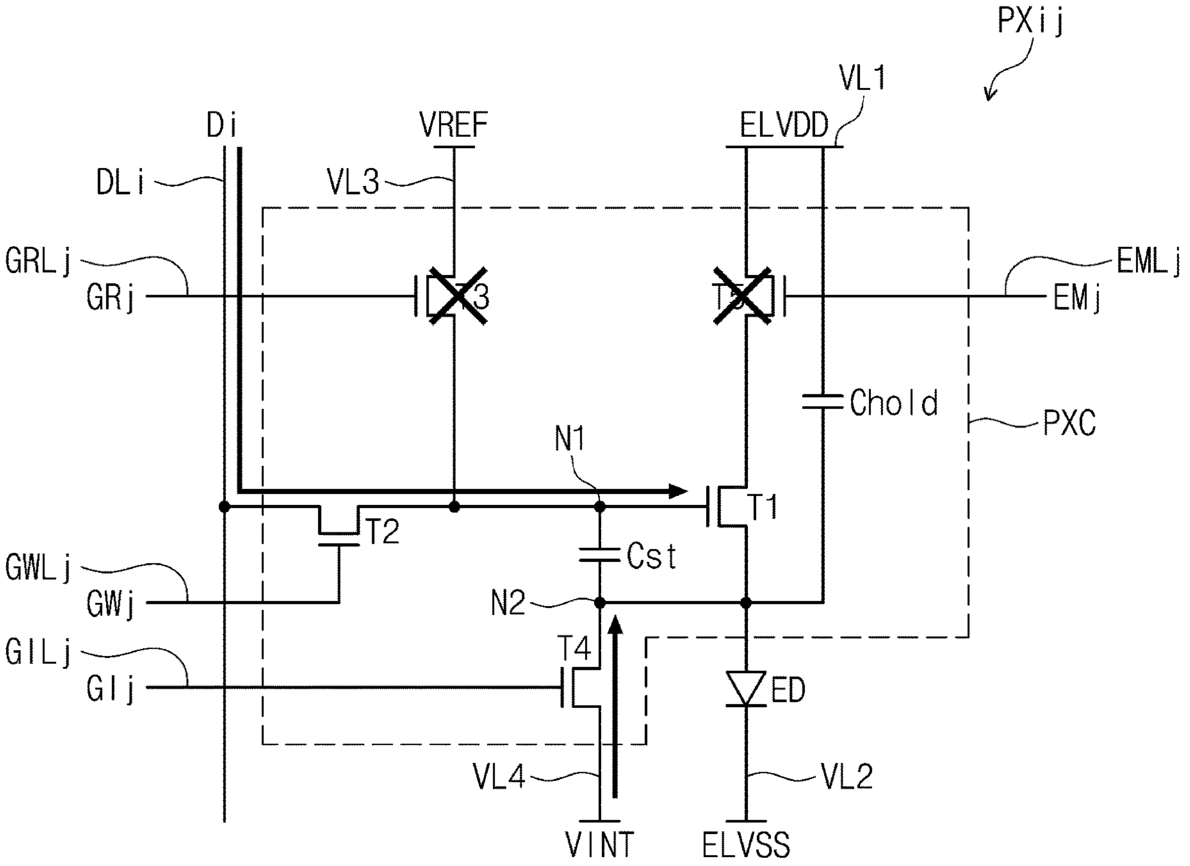
FIGS. 5A and 5B are diagrams for describing a method according to a second embodiment for detecting an initial threshold voltage of a first transistor in a pixel.
Figure 5B:
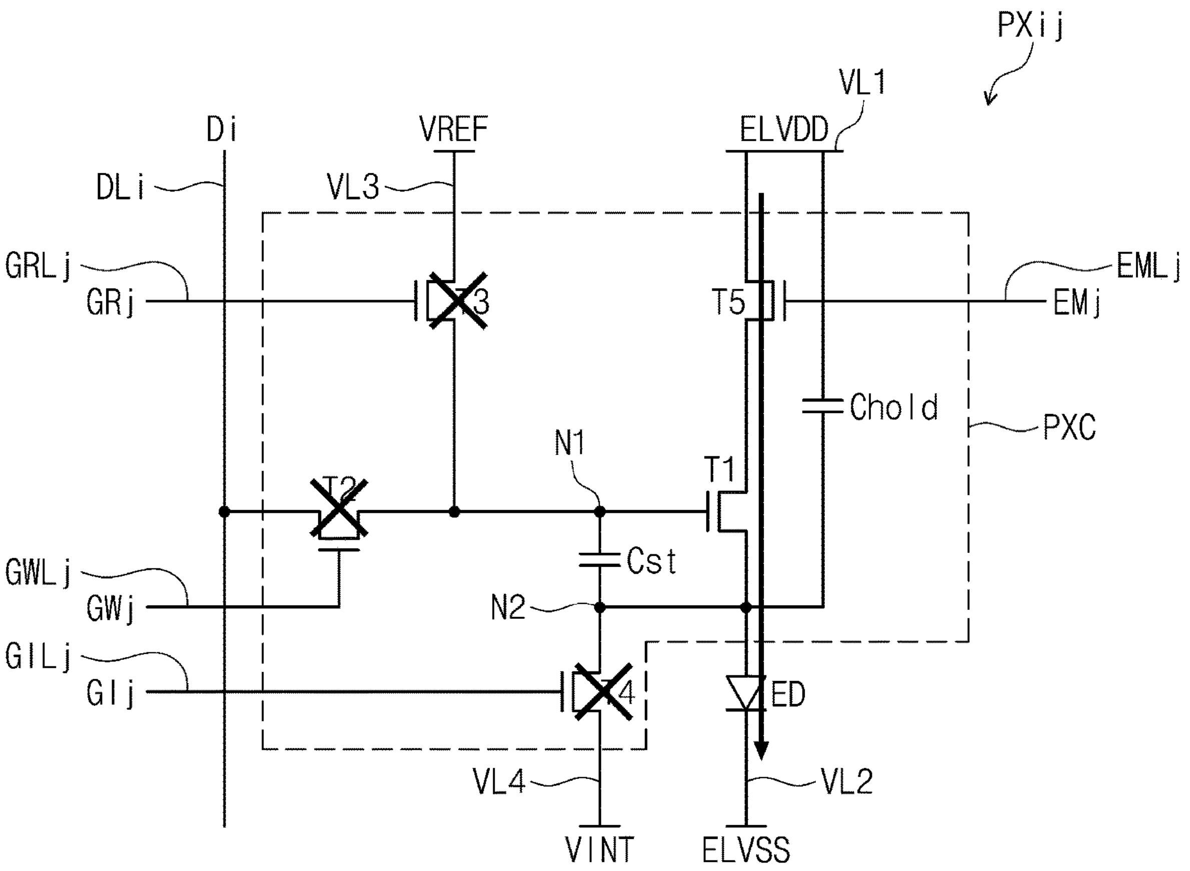

FIGS. 5A and 5B are diagrams for describing a method according to a second embodiment for detecting an initial threshold voltage of a first transistor in a pixel.

Referring to FIG. 5A, each of the scan signal GRj and the emission signal EMj is at an inactive level during the first period of the detection mode in which the initial threshold voltage of the first transistor T1 in the pixel PXij is detected. Accordingly, the third transistor T3 and the fifth transistor T5 are maintained in the turned off state.

In addition, when the scan signal GWj and the scan signal GIj respectively transition to an active level during the first period of the detection mode, the second transistor T2 and the fourth transistor T4 are turned on. Therefore, the data signal Di transferred through the data line DLi is provided to the gate electrode of the first transistor T1, that is, the first node N1, and the anode of the light emitting device ED may be initialized by the second initialization voltage VINT.

Referring to FIG. 5B, during the second period of the detection mode, when all of the scan signals GRj, GWj, and GIj transition to an inactive level and the emission signal EMj transitions to an active level, a current path is formed from the first driving voltage line VL1 to the second driving voltage line VL2 through the fifth transistor T5, the first transistor T1, and the light emitting device ED. During the first period of the detection mode illustrated in FIG. 5A, a current corresponding to the data signal Di provided to the gate electrode of the first transistor T1 flows to the light emitting device ED, and thus the light emitting device ED may emit light.

In an embodiment, in the production stage of the display device DD (refer to FIG. 1), the test device senses the light emission intensity, that is, the luminance, of the light emitting device ED during the detection mode to detect the initial threshold voltage of the first transistor T1.

A method according to the first embodiment for detecting the initial threshold voltage of the first transistor T1 in the pixel PXij has been described with reference to FIG. 4, and a method according to the second embodiment for detecting the initial threshold voltage of the first transistor T1 in the pixel PXij has been described with reference to FIGS. 5A and 5B. The initial threshold voltage of the first transistor T1 in the pixel PXij may be detected according to any one of the first and second embodiments.

Figure 6A:
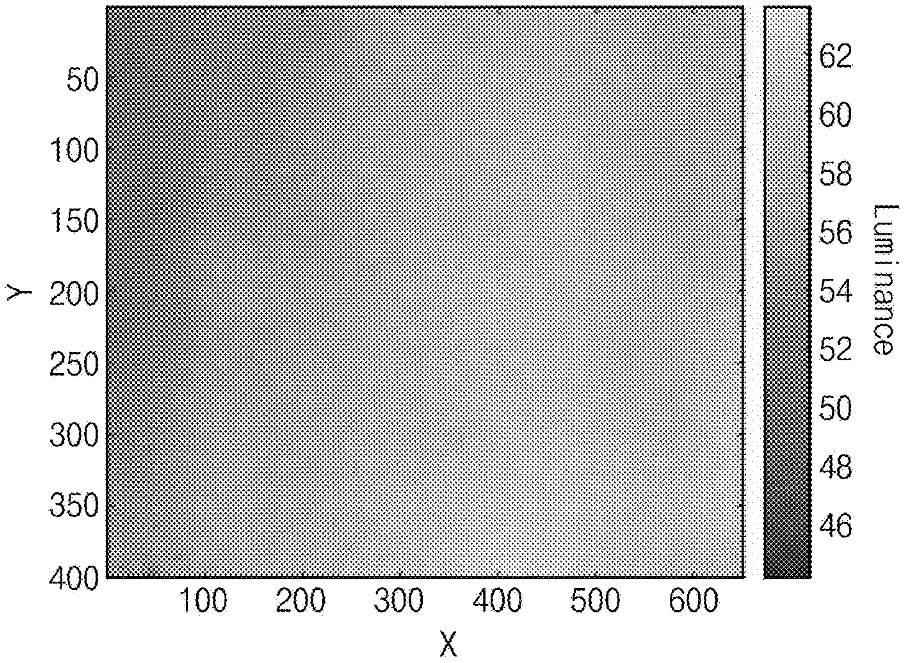
FIGS. 6A, 6B, and 6C are diagrams illustrating results of measuring a luminance of a display panel as an example.
Figure 6B:
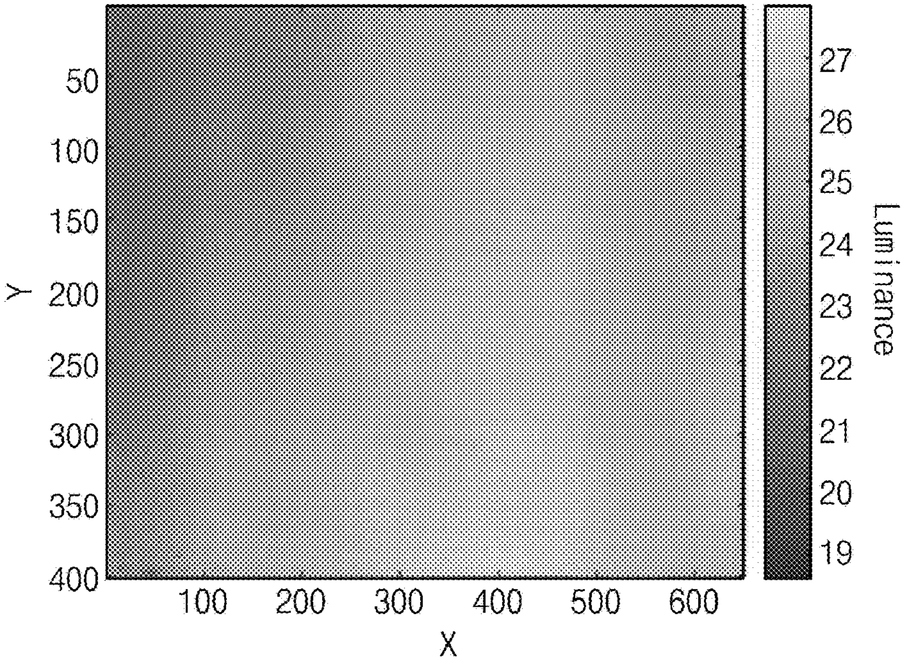
Figure 6C:
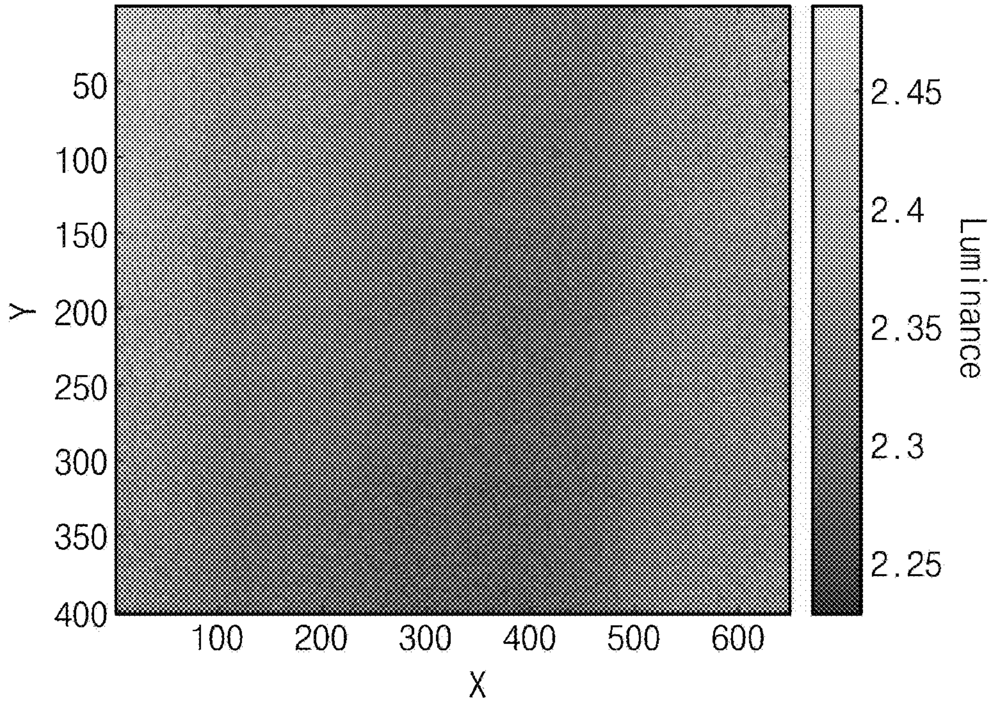

FIGS. 6A to 6C are diagrams illustrating results of measuring a luminance of a display panel to detect the initial threshold voltage of the first transistor T1 according to the second embodiment illustrated in FIGS. 5A and 5B, as an example.

FIG. 6A illustrates an image obtained by capturing the display panel when the data signal corresponds to 127 grayscales.

FIG. 6B illustrates an image obtained by capturing the display panel when the data signal corresponds to 87 grayscales.

FIG. 6C is a diagram illustrating an operation result of a captured image corresponding to 127 grayscales and a captured image corresponding to 87 grayscales, as an image.

In FIGS. 6A to 6C, a horizontal axis represents a coordinate X in the first direction DR1 of the display panel DP illustrated in FIG. 1, and a vertical axis represents a coordinate Yin the second direction DR2 of the display panel DP illustrated in FIG. 1.

In FIGS. 6A to 6C, as the luminance of the image displayed on the display panel DP increases, the image is displayed in a brighter color (i.e. towards the yellow color shown in the luminance scale at the right side of the color version of these figures), and as the luminance of the image displayed on the display panel DP decreases, the image is displayed in a darker color (i.e. towards the purple color shown in the luminance scale at the right side of the color version of these figures).

FIG. 6C illustrates a ratio La/Lb of a first luminance 'La' of the captured image corresponding to a first grayscale 'a' (e.g., 127 grayscales) corresponding to each pixel and a second luminance 'Lb' of the captured image corresponding to a second grayscale 'b' (e.g., 87 grayscales) corresponding to each pixel, as an image.

The ratio La/Lb of the first luminance 'La' of the captured image corresponding to the first grayscale 'a' and the second luminance 'Lb' of the captured image corresponding to the second grayscale 'b' may be represented by the following Equation 1.

$$\frac{La}{Lb} = \frac{\eta_a \times I_a}{\eta_b \times I_b} = \frac{(aVdata - VINT - Vkb - Vth)^2}{(bVdata - VINT - Vkb - Vth)^2} \quad \text{[Equation 1]}$$

In Equation 1, $\eta_a$ denotes a luminous efficacy of the captured image corresponding to the first grayscale 'a', Ia denotes a current flowing through the light emitting device ED corresponding to the first grayscale 'a', and $\eta_b$ denotes an luminous efficacy of the captured image corresponding to the second grayscale 'b', Ib denotes a current flowing through the light emitting device ED corresponding to the second grayscale.

Also, aVdata denotes a voltage level of the data signal Di corresponding to the first grayscale 'a', bVdata denotes a voltage level of the data signal Di corresponding to the second grayscale 'b', VINT denotes the second initialization voltage, Vkb denotes a kickback voltage according to a position of the pixel PX, and Vth denotes an initial threshold voltage of the pixel PX.

Figure 7:
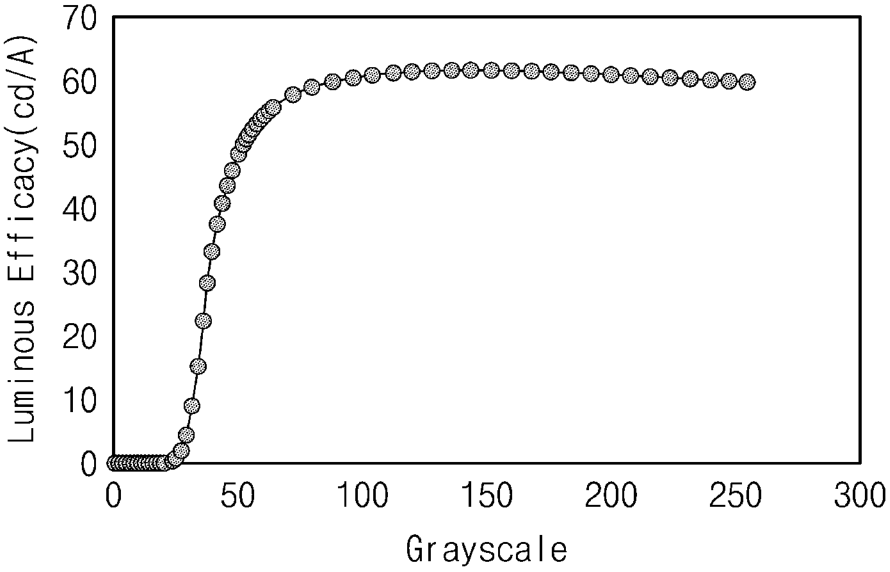
FIG. 7 a diagram illustrating an luminous efficacy of a pixel according to a grayscale of an input image signal as an example.

FIG. 7 illustrates an luminous efficacy of a pixel according to a grayscale of an input image signal as an example.

FIG. 7 illustrates an luminous efficacy of a pixel according to the grayscale of the input image signal I_RGB when the input image signal I_RGB has a red color.

In the example illustrated in FIG. 7, when the grayscale of the input image signal I_RGB is lower than a predetermined level (e.g., 70 grayscales), the change in the luminous efficacy of the pixel according to the grayscale of the input image signal I_RGB is relatively large. Also, when the grayscale of the input image signal I_RGB is greater than a predetermined level (e.g., 70 grayscales), the luminous efficacy of the pixel according to the grayscale of the input image signal I_RGB is uniform.

In Equation 1, Ia, Ib, aVdata, bVdata, VINT, and Vkb are known values. Also, when the efficiency $\eta_a$ of the captured image corresponding to the first grayscale 'a' and the efficiency $\eta_b$ of the captured image corresponding to the second grayscale 'b' are the same ($\eta_a = \eta_b$), in Equation 1, an initial threshold voltage Vth may be calculated.

Figure 8:
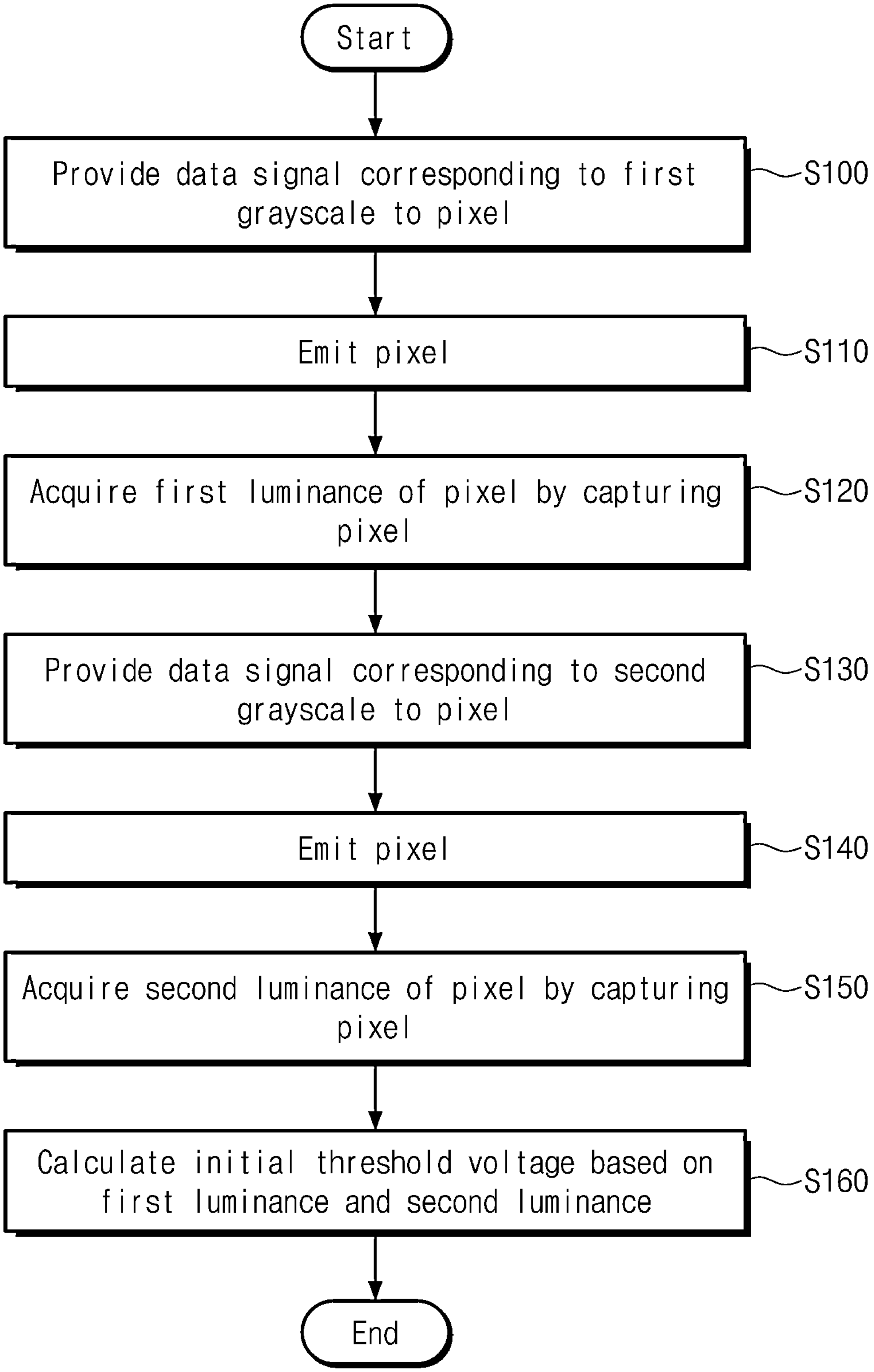
FIG. 8 is a flowchart illustrating a method of obtaining an initial threshold voltage of a pixel.

FIG. 8 is a flowchart illustrating a method of obtaining an initial threshold voltage of a pixel.

Referring to FIGS. 5A, 5B and 8, during the first period of the detection mode for detecting the initial threshold voltage of the first transistor T1 in the pixel PXij, the data signal Di corresponding to the first grayscale is provided to the pixel PXij (operation S100). In this case, the scan signals GWj and GIj are at an active level, and the scan signals GRj and the emission signal EMj are at an inactive level. Therefore, the data signal Di may be provided to the gate electrode of the first transistor T1.

During the second period of the detection mode, when all of the scan signals GRj, GWj, and GIj transition to the inactive level and the emission signal EMj transitions to the active level, a current corresponding to the data signal Di flows to the light emitting device ED, and thus the light emitting device ED may emit light (operation S110).

The test device acquires the first luminance 'La' of the pixel PXij by capturing the pixel PXij (operation S120). The first luminance 'La' of the pixel PXij may be the amount of light of the light emitting device ED corresponding to the first grayscale.

Again, the data signal Di corresponding to the second grayscale is provided to the pixel PXij during the first period of the detection mode (operation S130). In this case, the scan signals GWj and GIj are at active levels, and the scan signals GRj and the emission signal EMj are at inactive levels. Therefore, the data signal Di may be provided to the gate electrode of the first transistor T1.

Again, during the second period of the detection mode, when all of the scan signals GRj, GWj, and GIj transition to the inactive level and the emission signal EMj transitions to the active level, a current corresponding to the data signal Di flows to the light emitting device ED, and thus the light emitting device ED may emit light (operation S140).

The test device acquires the second luminance 'Lb' of the pixel PXij by capturing the pixel PXij (operation S150). The second luminance 'Lb' of the pixel PXij may be the amount of light of the light emitting device ED corresponding to the second grayscale.

The test device may calculate the initial threshold voltage Vth by Equation 1 based on the first luminance 'La' and the second luminance 'Lb' of the pixel PXij (operation S160).

The initial threshold voltage Vth of the pixel PXij may be stored in the initial threshold voltage map 110 illustrated in FIG. 3.

The method of obtaining the initial threshold voltage Vth of the pixel PXij as illustrated in FIG. 8 is not limited to the circuit configuration of the pixel PXij illustrated in FIG. 2. According to the method of obtaining the initial threshold voltage of the present disclosure, the initial threshold voltage Vth of a transistor (e.g., the first transistor T1) that provides a current to the light emitting device ED may be obtained regardless of the number of transistors and the types (e.g., N-type transistor and P-type transistor) of transistors in the pixel circuit PXC of the pixel PXij.

Figure 9:
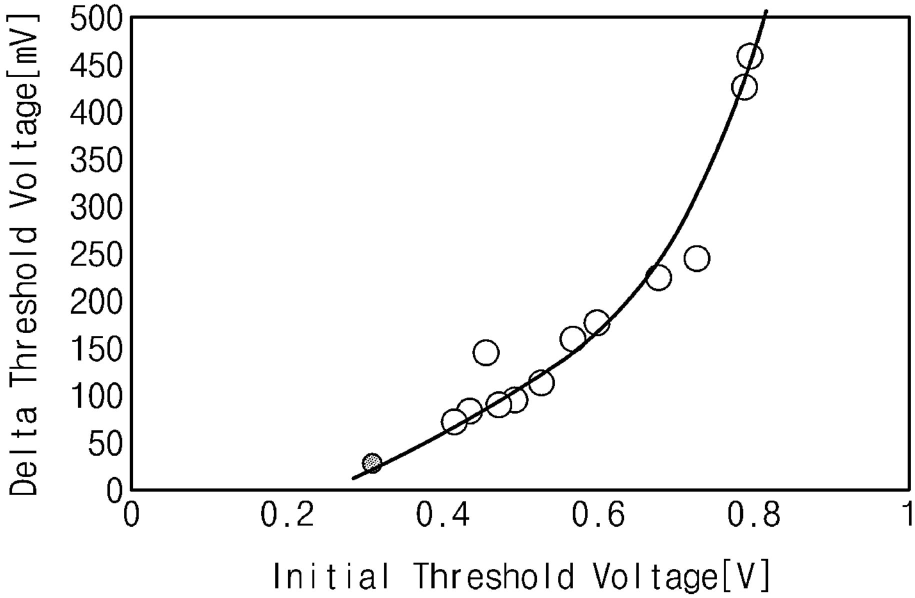
FIG. 9 is a diagram illustrating a delta threshold voltage according to an initial threshold voltage as an example.

FIG. 9 is a diagram illustrating a delta threshold voltage according to an initial threshold voltage as an example.

Referring to FIGS. 2 and 9, the initial threshold voltage of the first transistor T1 in the pixel PXij may be different for each pixel PX illustrated in FIG. 1. Also, the threshold voltage of the first transistor T1 in the pixel PXij may be changed depending on the voltage level of the initial threshold voltage when the display device DD operates for a predetermined time.

FIG. 9 illustrates the delta threshold voltage according to the initial threshold voltage of the first transistor T1 when the display device DD operates for a predetermined time (e.g., 24 hours), as an example. The delta threshold voltage refers to the amount of change in the threshold voltage.

In the example illustrated in FIG. 9, when the initial threshold voltage of the first transistor T1 is 0.4V, it appears that the delta threshold voltage is 100 mV, and when the initial threshold voltage of the first transistor T1 is 0.8V, it appears that the delta threshold voltage is 450 mV.

In the example illustrated in FIG. 9, it may be seen that the delta threshold voltage increases as the initial threshold voltage of the first transistor T1 increases.

However, the initial threshold voltage and the delta threshold voltage of the first transistor T1 illustrated in FIG. 9 are only predicted values according to a simulation, and the delta threshold voltage may vary in an actual operating environment of the display device DD. Also, the delta threshold voltage of the display device DD may be a voltage level stored in a memory, and may be calculated using a preset equation.

Figure 10:
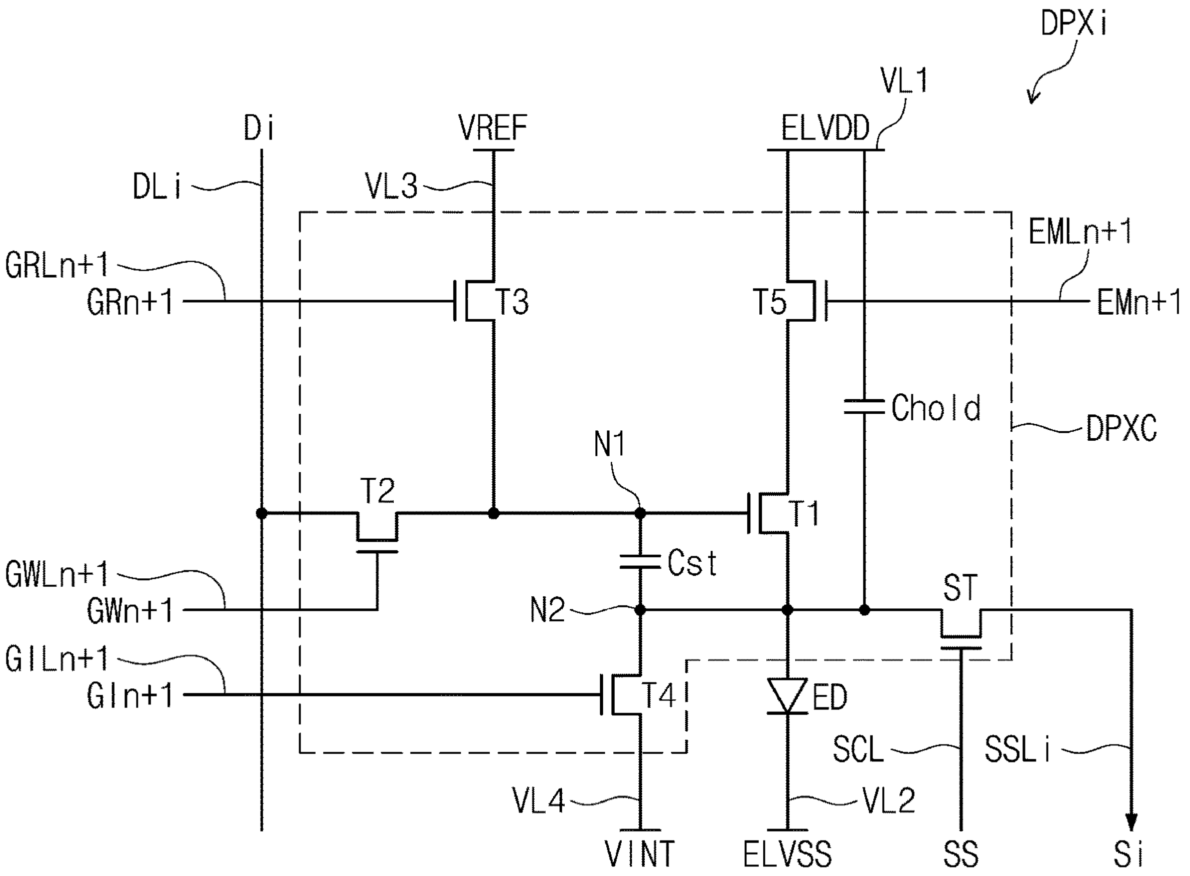
FIG. 10 is a circuit diagram of a dummy pixel, according to an embodiment of the present disclosure.

FIG. 10 is a circuit diagram of a dummy pixel, according to an embodiment of the present disclosure.

In FIG. 10, there is illustrated a dummy pixel DPXi that is connected with the i-th data line DLi among the data lines DL1 to DLm, the scan lines GILn+1, GRLn+1, and GWLn, and the emission line EMLn+1, which are illustrated in FIG. 1, as an example.

Each of the plurality of dummy pixels DPX illustrated in FIG. 1 may have the same circuit configuration as the dummy pixel DPXi illustrated in FIG. 10.

Referring to FIG. 10, the dummy pixel DPXi according to an embodiment includes a dummy pixel circuit DPXC and at least one light emitting device ED. The light emitting device ED in the dummy pixel DPXi may be a dummy light emitting device.

The dummy pixel circuit DPXC has a configuration similar to that of the pixel circuit PXC illustrated in FIG. 2. Among the components of the dummy pixel circuit DPXC, components similar to those of the pixel circuit PXC illustrated in FIG. 2 are denoted by the same reference numerals, and additional descriptions will be omitted to avoid redundancy.

The dummy pixel circuit DPXC includes a sensing transistor ST. The sensing transistor ST is connected between the second node N2 and a sensing line SSLi and includes a gate electrode connected to the sensing control line SCL.

During a normal mode, the dummy pixel DPXi may operate in the same manner as the pixel PXij illustrated in FIG. 2. The data signal Di provided to the dummy pixel DPXi may be the same as the data signal Di provided to the pixel PXij. During the normal mode, the first transistor T1 in the dummy pixel DPXi operates in the same manner as the pixel PXij, such that the characteristic change of the first transistor T1 in the dummy pixel DPXi may be similar to that of the first transistor T1 in the pixel PXij.

Figure 11A:
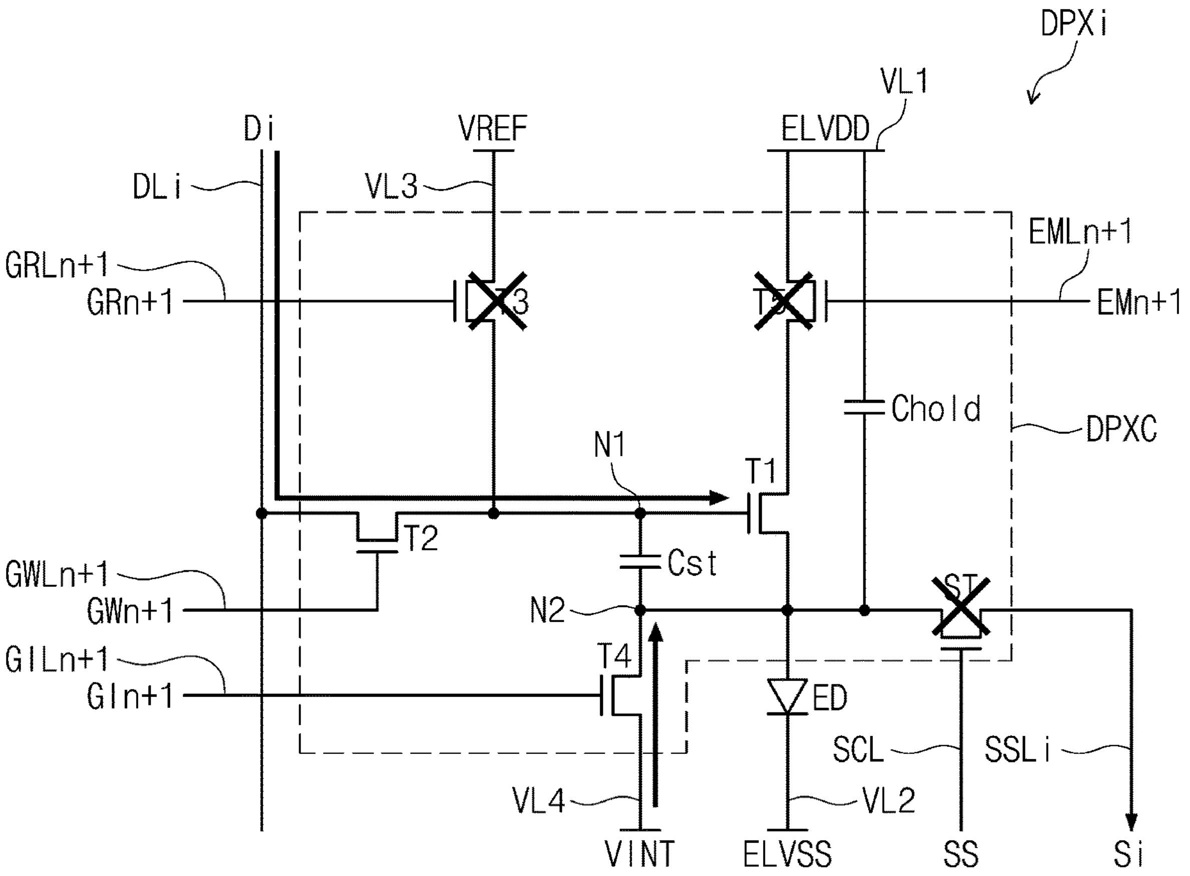
FIGS. 11A and 11B are diagrams for describing an operation of a dummy pixel during a sensing mode.
Figure 11B:
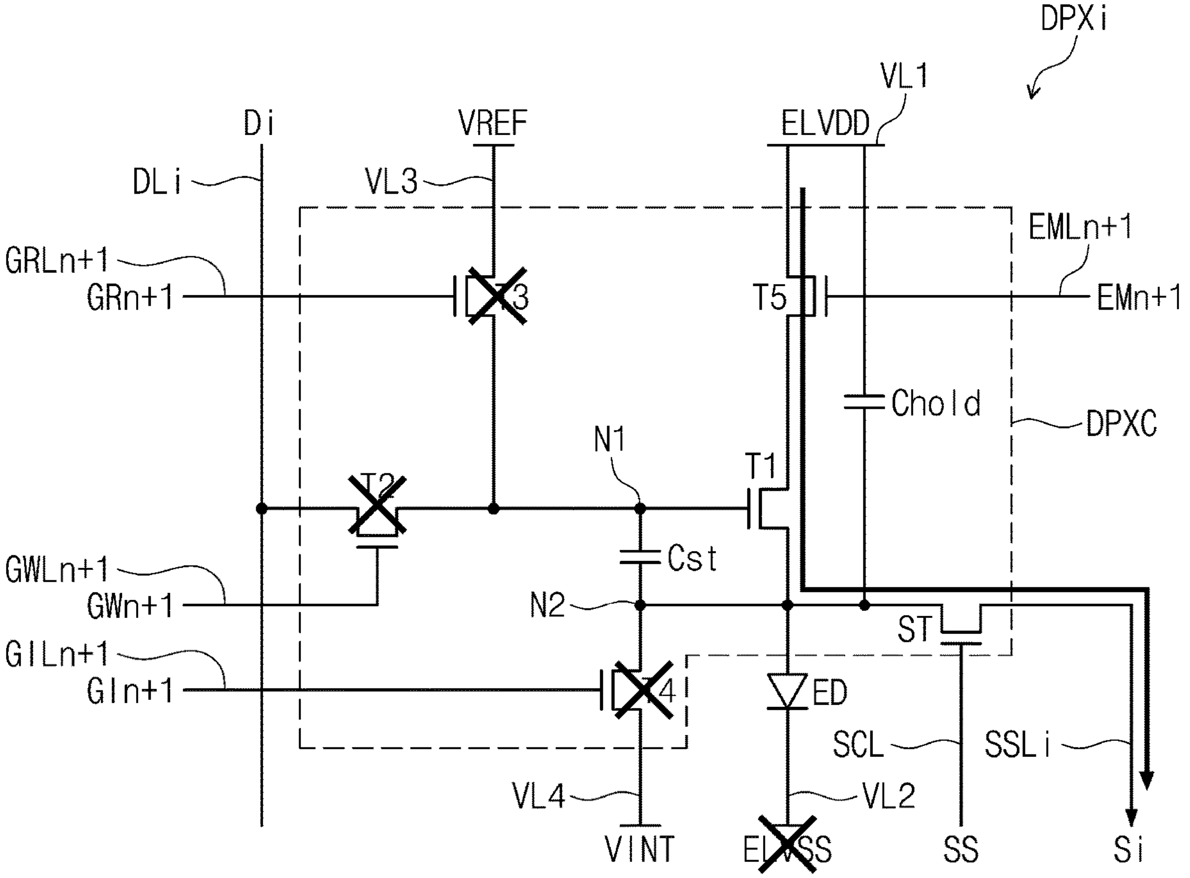

FIGS. 11A and 11B are diagrams for describing an operation of a dummy pixel during a sensing mode.

Referring to FIG. 11A, the scan signal GRn+1 and the emission signal EMn+1 are at inactive levels during the first period of the sensing mode. Accordingly, the third transistor T3 and the fifth transistor T5 are maintained in the turned off state. Also, in the first period, the sensing transistor ST may be maintained in a turned-off state.

When the scan signal GWn+1 and the scan signal GIn+1 respectively transition to active levels during the first period of the sensing mode, the second transistor T2 and the fourth transistor T4 are turned on. Therefore, the data signal Di transferred through the data line DLi is provided to the gate electrode of the first transistor T1, that is, the first node N1, and the anode of the light emitting device ED may be initialized by the second initialization voltage VINT.

Referring to FIG. 11B, when the sensing control signal SS provided through the sensing control line SCL during the second period of the sensing mode is at an active level (e.g., high level), the sensing transistor ST is turned on. In this case, when the fifth transistor T5 is turned on, a current path may be formed to the sensing line SSLi through the first driving voltage line VL1, the fifth transistor T5, the first transistor T1, and the sensing transistor ST. A sensing signal Si of the sensing line SSLi may be a voltage signal. The sensing signal Si of the sensing line SSLi may correspond to the threshold voltage of the first transistor T1.

Referring back to FIG. 3, the feedback threshold voltage calculator 130 receives sensing signals S1 to Sm from the dummy pixels DPX. The feedback threshold voltage calculator 130 calculates a feedback threshold voltage FVth based on the sensing signals S1 to Sm. The feedback threshold voltage FVth may be a threshold voltage of each of the dummy pixels DPX. The feedback threshold voltage FVth is provided to the delta threshold voltage calculator 120.

The delta threshold voltage calculator 120 calculates the delta threshold voltage DVth based on the initial threshold voltage Vth provided from the initial threshold voltage map 110 and the feedback threshold voltage FVth from the feedback threshold voltage calculator 130.

In the example illustrated in FIG. 9, when the initial threshold voltage of the first transistor T1 is 0.4V when the display device DD operates for a predetermined time (e.g., 24 hours), it appears that the delta threshold voltage is 100 mV, and when the initial threshold voltage of the first transistor T1 is 0.8V, it appears that the delta threshold voltage is 450 mV.

Since the delta threshold voltage calculator 120 knows the initial threshold voltages of the pixels PX and the dummy pixels DPX in advance, the delta threshold voltage calculator 120 may calculate the delta threshold voltage DVth of each of the pixels PX based on a difference value between the feedback threshold voltage FVth of the dummy pixels DPX and the predicted delta threshold voltage when the display device DD operates for a predetermined time.

The weight calculator 140 initially outputs the weight W based on the initial threshold voltage Vth. The amount of change in the threshold voltage of the first transistor T1 in the pixels PX may vary depending on the grayscale of the input image signal I_RGB. Therefore, the weight calculator 140 may calculate the weight W based on the grayscale of the input image signal I_RGB as well as the initial threshold voltage Vth. Also, the amount of change in the threshold voltage of the first transistor T1 in the pixels PX may be affected by an ambient temperature. The weight calculator 140 may calculate the weight W based on the ambient temperature as well as the initial threshold voltage Vth and the input image signal I_RGB.

The weight calculator 140 may calculate the weight W based on the operating time of the display device DD as well as the initial threshold voltage Vth, the input image signal I_RGB, and the ambient temperature.

The weight calculator 140 may calculate the weight W by considering the delta threshold voltage DVth and the initial threshold voltage Vth when the operating time of the display device DD has elapsed for a predetermined time or longer.

In an embodiment, the driving controller 100 may periodically (e.g., every several hours) receive the sensing signals S1 to Sm from the dummy pixels DPX. When the sensing signals S1 to Sm are received, the feedback threshold voltage calculator 130 in the driving controller 100 calculates the feedback threshold voltage FVth based on the sensing signals S1 to Sm.

The delta threshold voltage calculator 120 may periodically (e.g., every several hours) recalculate the delta threshold voltage DVth based on the initial threshold voltage Vth and the feedback threshold voltage FVth.

Figure 12:
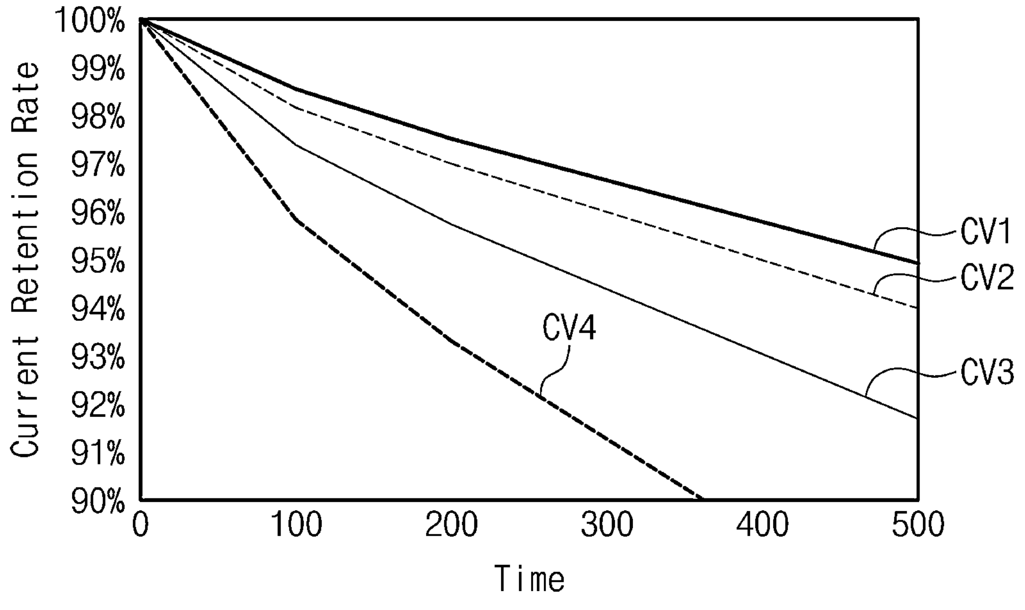
FIG. 12 is a diagram illustrating a current retention rate of a light emitting device over an operating time of a display device as an example.

FIG. 12 is a diagram illustrating a current retention rate of a light emitting device over an operating time of a display device as an example.

Referring to FIGS. 2 and 12, when the data signal Di corresponding to a predetermined grayscale (e.g., 31 grayscales) is provided to the pixel PXij, the amount of change over the operating time of the current flowing into the light emitting device ED, that is, the current retention rate may vary depending on the delta threshold voltage of the first transistor T1.

Curves CV1, CV2, CV3, and CV4 in FIG. 12 represent current retention rates when the delta threshold voltages are 23 mV, 32 mV, 55 mV, and 88 mV, respectively. In the example illustrated in FIG. 12, as the delta threshold voltage increases, the current retention rate over the operating time decreases. In detail, the current retention rate of the second pixel having the delta threshold voltage of 88 mV is lesser than that of the first pixel having the delta threshold voltage of 23 mV, and as the operating time increases, a deviation of the current retention ratio between the first pixel and the second pixel increases.

Referring to FIG. 3 again, the weight calculator 140 illustrated in FIG. 3 may increase the weight W as the delta threshold voltage DVth increases.

The compensator 150 may receive the input image signal I_RGB and may output the output image signal O_RGB obtained by compensating for the threshold voltage of the first transistor T1 based on the weight W.

Figure 13:
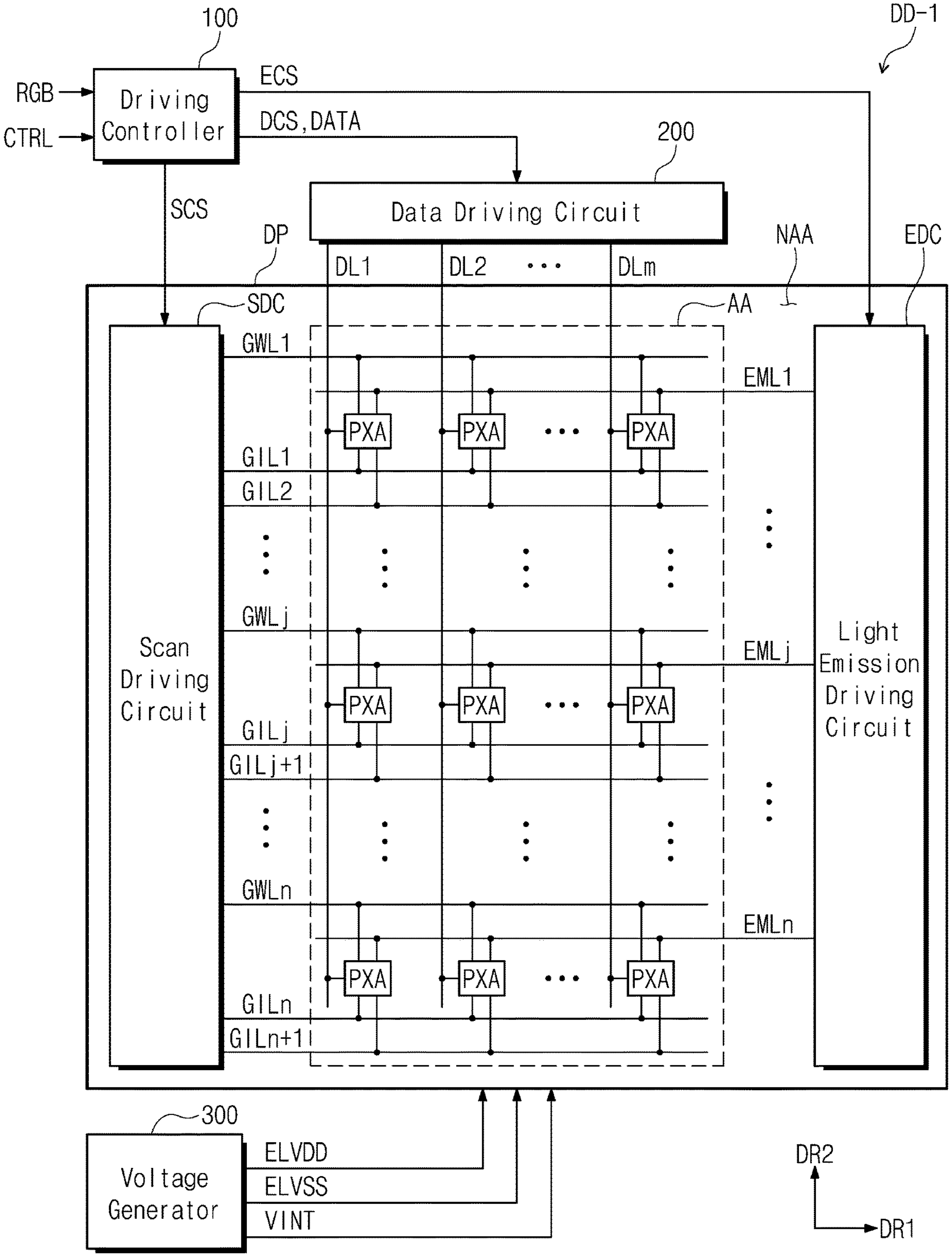
FIG. 13 is a block diagram of a display device, according to an embodiment of the present disclosure.

FIG. 13 is a block diagram of a display device, according to an embodiment of the present disclosure.

Referring to FIG. 13, a display device DD-1 includes the display panel DP, the driving controller 100, the data driving circuit 200, and the voltage generator 300. The display device DD-1 illustrated in FIG. 13 may include components similar to those of the display device DD illustrated in FIG. 1. Only a portion different from the display device DD illustrated in FIG. 1 among the configurations of the display device DD-1 illustrated in FIG. 13 will be described.

The display panel DP includes the scan lines GIL1 to GILn+1 and GWL1 to GWLn+1, the emission lines EML1 to EMLn, the data lines DL1 to DLm, and pixels PXA.

The plurality of pixels PXA are electrically connected with the scan lines GIL1 to GILn+1 and GWL1 to GWLn, the emission lines EML1 to EMLn, and the data lines DL1 to DLm. Each of the plurality of pixels PXA may be electrically connected with three scan lines and one emission line. For example, as illustrated in FIG. 13, a first row of pixels may be connected to the scan lines GWL1, GIL1, and GIL2 and the emission line EML1. Furthermore, a j-th row of pixels may be connected to the scan lines GWLj, GILj, and GILj+1 and the emission line EMLj.

The voltage generator 300 generates voltages necessary for an operation of the display panel DP. In an embodiment, the voltage generator 300 generates the first driving voltage ELVDD, the second driving voltage ELVSS, and the second initialization voltage VINT.

Figure 14:
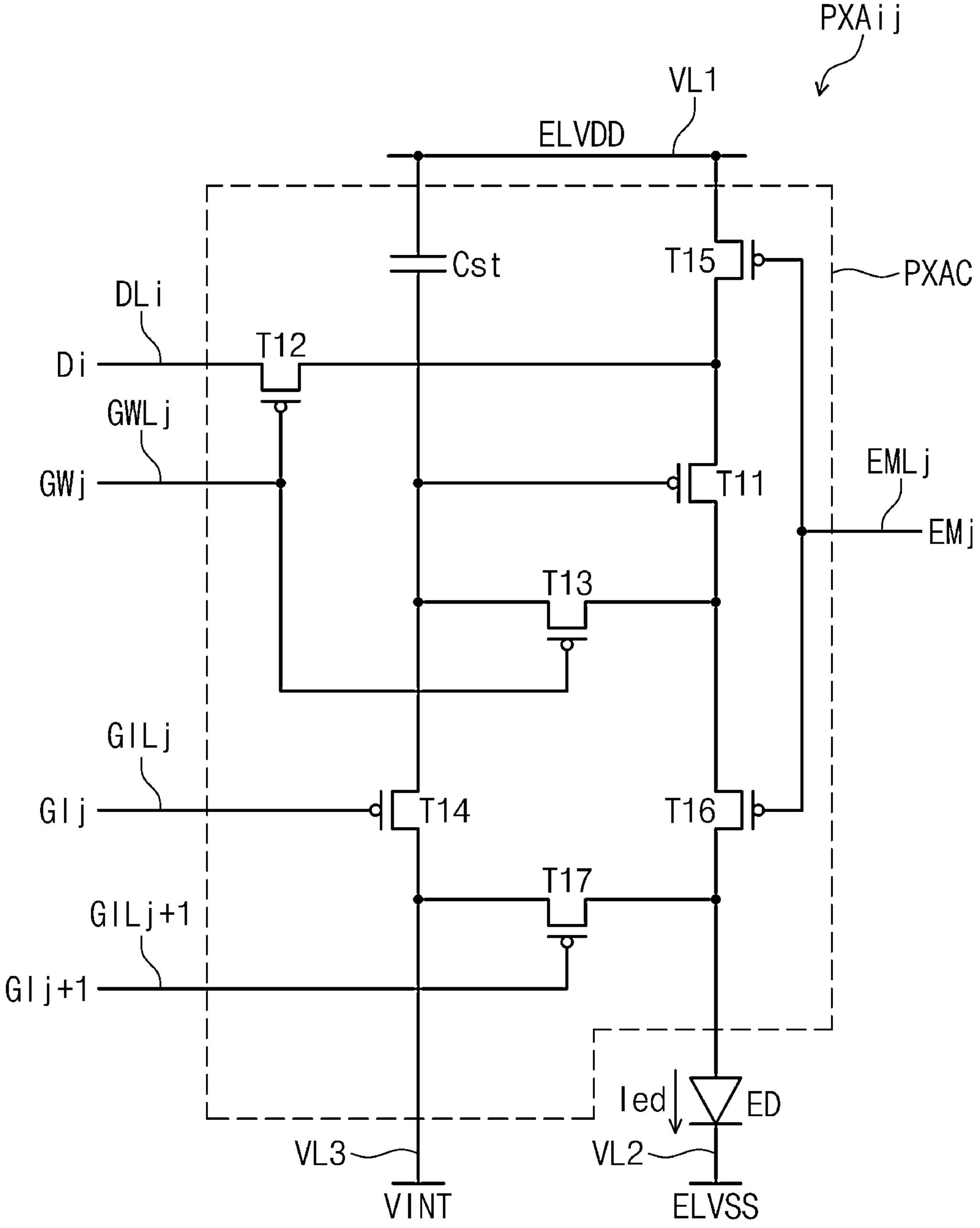
FIG. 14 is an equivalent circuit diagram of a pixel, according to an embodiment of the present disclosure.

FIG. 14 is an equivalent circuit diagram of a pixel, according to an embodiment of the present disclosure.

FIG. 14 illustrates an equivalent circuit diagram of a pixel PXAij connected to the i-th data line DLi among the data lines DL1 to DLm, the j-th scan lines GWLj and GILj among the scan lines GIL1 to GILn+1 and GWL1 to GWLn, the (j+1)-th scan line GILj+1, and the j-th emission line EMLj among the emission lines EML1 to EMLn, which are illustrated in FIG. 13.

Each of the plurality of pixels PXA illustrated in FIG. 13 may have the same circuit configuration as the pixel PXij illustrated in FIG. 14.

Referring to FIG. 14, the pixel PXAij of a display device according to an embodiment includes a pixel circuit PXAC and at least one light emitting diode ED. In an embodiment, it is described that the one pixel PXAij includes one light emitting diode ED. The pixel circuit PXAC includes first to seventh transistors T11, T12, T13, T14, T15, T16, and T17 and a capacitor Cst.

In an embodiment, each of the first to seventh transistors T11 to T17 is a P-type transistor having a low-temperature polycrystalline silicon (LTPS) semiconductor layer. However, the present disclosure is not limited thereto. For example, all of the first to seventh transistors T11 to T17 may be N-type transistors. In an embodiment, at least one of the first to seventh transistors T11 to T17 may be an N-type transistor, and the remaining transistors may be P-type transistors. In addition, the circuit configuration of the pixel according to the present disclosure is not limited to FIG. 14. The pixel circuit PXAC illustrated in FIG. 14 is only an example. For example, the configuration of the pixel circuit PXAC may be modified and implemented.

The scan lines GWLj, GILj, and GILj+1 may transfer the scan signals GWj, GIj, GIj+1, respectively, and the emission line EMLj may transfer the emission signal EMj. The data line DLi transfers the data signal Di. The data signal Di may have a voltage level corresponding to the image signal RGB input to the display device DD (refer to FIG. 13).

The first transistor T11 includes a first electrode connected to the first driving voltage line VL1 through the fifth transistor T15, a second electrode electrically connected to the anode of the light emitting diode ED through the sixth transistor T16, and a gate electrode connected to one end of the capacitor Cst. The first transistor T11 may receive the data signal Di transferred by the data line DLi depending on the switching operation of the second transistor T12 and then may supply the driving current Id to the light emitting diode ED.

The second transistor T12 includes a first electrode connected with the data line DLi, a second electrode connected with the first electrode of the first transistor T11, and a gate electrode connected with the scan line GWLj. The second transistor T12 may be turned on depending on the scan signal GWj received through the scan line GWLj and then may transfer the data signal Di transferred from the data line DLi to a first electrode SE of the first transistor T11.

The third transistor T13 includes a first electrode connected with the gate electrode of the first transistor T11, a second electrode connected with the second electrode of the first transistor T11, and a gate electrode connected with the scan line GWLj. The third transistor T13 may be turned on depending on the scan signal GWj transferred through the scan line GWLj, and thus, the gate electrode and the second electrode of the first transistor T11 may be connected, that is, the first transistor T11 may be diode-connected.

The fourth transistor T14 includes a first electrode connected to the gate electrode of the first transistor T11, a second electrode connected to the third driving voltage line VL3 through which the initialization voltage VINT is supplied, and a gate electrode connected to the scan line GILj. The fourth transistor T14 may be turned on depending on the scan signal GIj received through the scan line GILj, and may transfer the initialization voltage VINT to the gate electrode of the first transistor T11.

The fifth transistor T15 includes a first electrode connected to the first driving voltage line VL1, a second electrode connected to the first electrode of the first transistor T11, and a gate electrode connected to the emission line EMLj.

The sixth transistor T16 includes a first electrode connected to the second electrode of the first transistor T11, a second electrode connected to the anode of the light emitting diode ED, and a gate electrode connected to the emission line EMLj.

The fifth transistor T15 and the sixth transistor T16 may be simultaneously turned on depending on the emission signal EMj transferred through the emission line EMLj. As such, the first driving voltage ELVDD may be compensated for through the diode-connected transistor T11 so as to be transferred to the light emitting diode ED.

The seventh transistor T17 includes a first electrode connected with the second electrode of the sixth transistor T16, a second electrode connected with the third driving voltage line VL3, and a gate electrode connected with the scan line GILj+1. When the seventh transistor T17 is turned on depending on the scan signal GIj+1 transferred through the scan line GILj+1, the anode of the light emitting diode ED may be initialized by the initialization voltage VINT.

One end of the capacitor Cst is connected to the gate electrode of the first transistor T11, and the other end of the capacitor Cst is connected to the first driving voltage line VL1. A cathode of the light emitting diode ED may be connected to the second driving voltage line VL2 that transfers the second driving voltage ELVSS. The structure of the pixel PXAij according to an embodiment is not limited to the structure illustrated in FIG. 14. For example, the number of transistors included in one pixel PXAij, the number of capacitors included in the pixel PXAij, and the connection relationship between the transistors and the capacitors may be variously modified.

Figure 15:
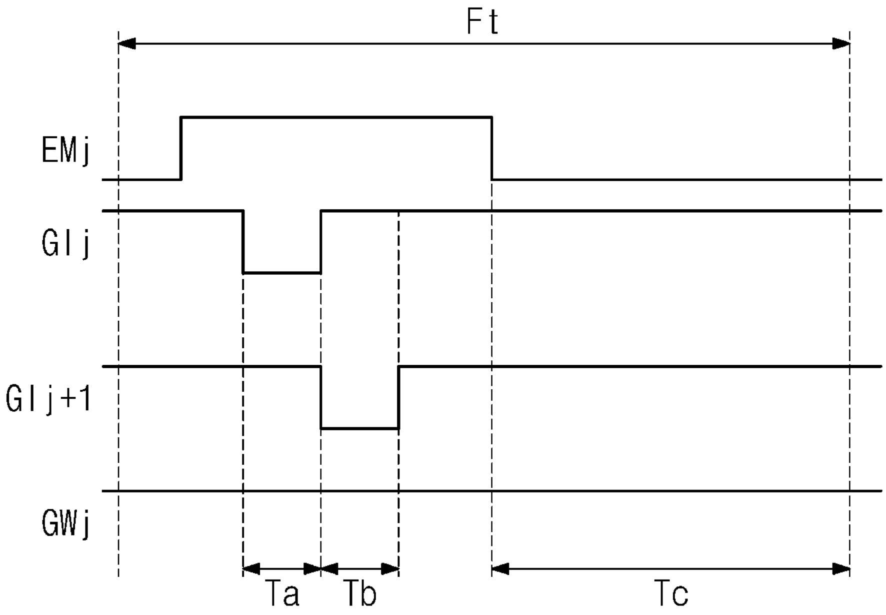
FIG. 15 is a timing diagram for detecting an initial threshold voltage of a first transistor in a pixel illustrated in FIG. 14.

FIG. 15 is a timing diagram for detecting an initial threshold voltage of the first transistor T11 in the pixel PXAij illustrated in FIG. 14.

Figure 16A:
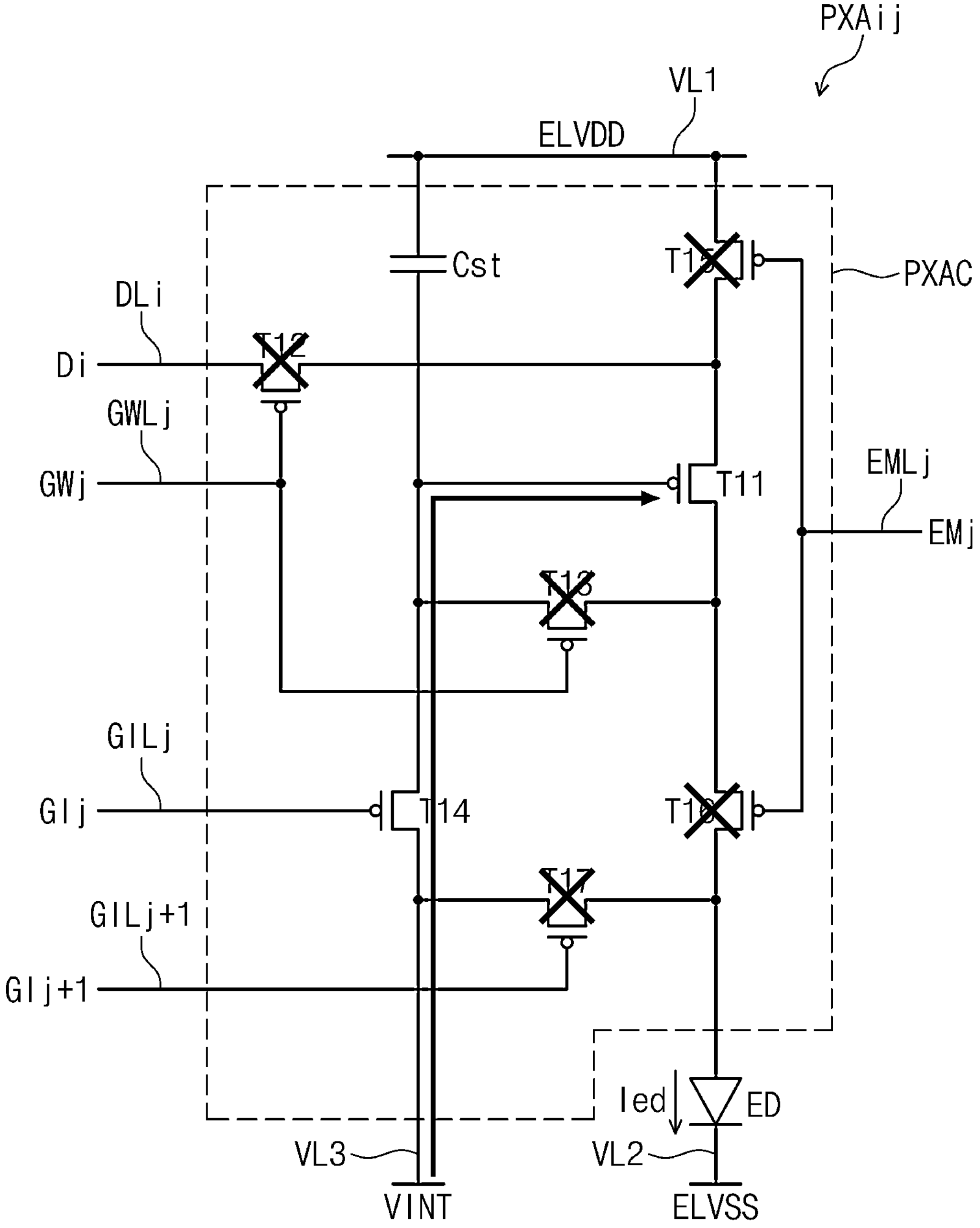
FIGS. 16A, 16B, and 16C are diagrams for describing a method according to a second embodiment for detecting an initial threshold voltage of a first transistor in a pixel.
Figure 16B:
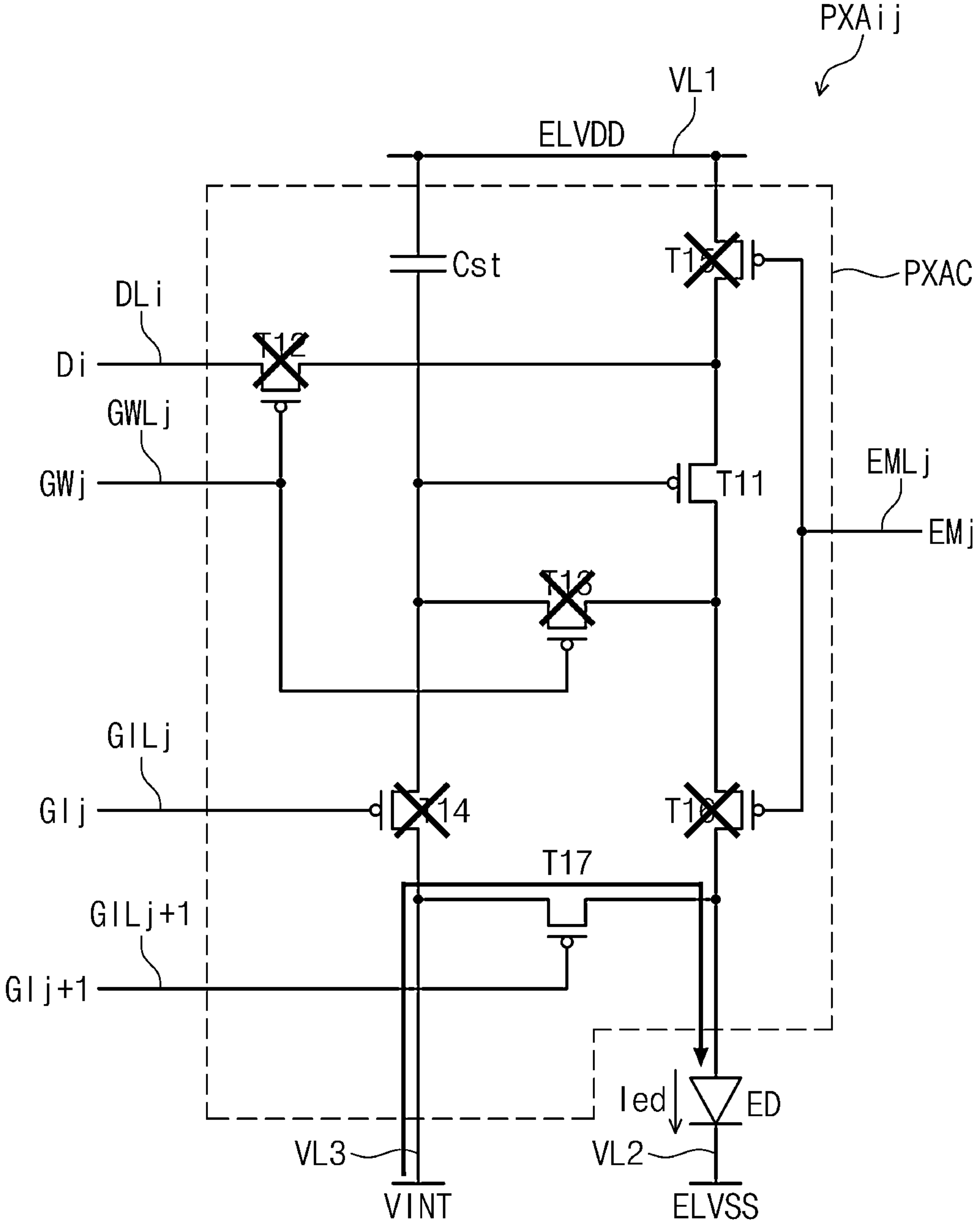
Figure 16C:
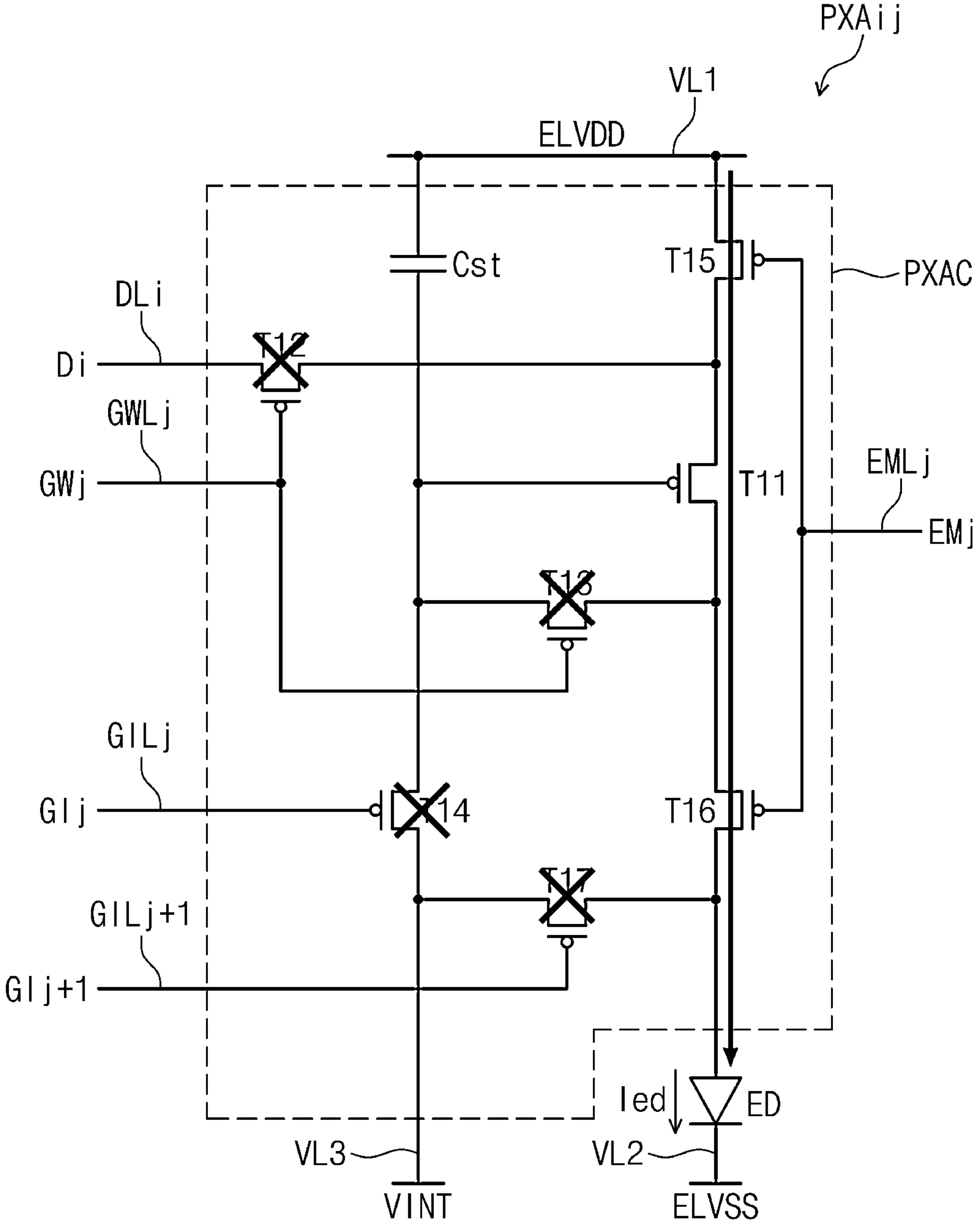

FIGS. 16A, 16B, and 16C are diagrams for describing a method according to a second embodiment for detecting an initial threshold voltage of the first transistor T11 in the pixel PXAij.

Referring to FIGS. 14, 15, and 16A, the scan signal GIj having a low level is provided through the scan line GILj during a first period Ta within a test frame Ft. The fourth transistor T14 is turned on in response to the scan signal GIj having a low level, and the initialization voltage VINT is transferred to the gate electrode of the first transistor T11 through the fourth transistor T14.

During the first period Ta, the second, third, fifth, sixth, and seventh transistors T12, T13, T15, T16, and T17 are in a turned off state.

The pixel circuit PXAC includes seven transistors T11 to T17, but only the two transistors T11 and T14 may be turned on during the first period Ta.

Referring to FIGS. 14, 15, and 16B, the scan signal GIj+1 having a low level is provided through the scan line GILj+1 during a second period Tb within the test frame Ft. The seventh transistor T17 is turned on in response to the scan signal GIj+1 having a low level, and then the initialization voltage VINT is transferred to the gate electrode of the first transistor T11 through the seventh transistor T17. The anode of the light emitting diode ED may be initialized to the initialization voltage VINT.

During the second period Tb, the second, third, fourth, fifth, and sixth transistors T12, T13, T14, T15, and T16 are in a turned off state.

Referring to FIGS. 14, 15, and 16C, the emission signal EMj having a low level is provided through the emission line EMLj during a third period Tc within the test frame Ft. When the fifth transistor T15 and the sixth transistor T16 are turned on in response to the emission signal EMj having a low level, a current path is formed from the first driving voltage line VL1 to the second driving voltage line VL2 through the fifth transistor T15, the first transistor T11, the sixth transistor T16. and the light emitting diode ED.

Accordingly, the second, third, fourth, and seventh transistors T12, T13, T14, and T17 are in a turned off state.

A voltage (referred to as Vgs) between the gate electrode and the first electrode of the first transistor T11 is the same as a difference VINT−ELVDD between the initialization voltage VINT and the first driving voltage ELVDD. The current Ied provided to the light emitting diode ED in the third period Tc is expressed by Equation 2.

$$Ied=k(VINT-ELVDD-Vth)^2 \quad \text{[Equation 2]}$$

Here, k denotes a constant.

During the first period Ta, the second period Tb, and the third period Tc, the scan signal GWj is maintained at a high level. Since the scan signal GWj is at a high level, the second transistor T12 and the third transistor T13 may be continuously maintained in a turned off state. In particular, as the third transistor T13 is maintained in the turned off state, the threshold voltage (referred to as Vth) of the first transistor T11 is not compensated. Therefore, the current Ied provided to the light emitting diode ED may depend on the threshold voltage Vth of the first transistor T11.

When the display device DD-1 starts to be used, the pixel PXAij is captured when the current Ied is provided to the pixel PXAij by the method illustrated in FIGS. 15, 16A, 16B, and 16C, and thus the threshold voltage Vth of the first transistor T11 may be obtained.

In Equation 1, since $La=\eta_a \times I_a$, the luminance La is obtained by capturing the pixel PXAij, and the current Ia may be calculated. By substituting the current Ia into the current Ied of Equation 2, the threshold voltage Vth of the first transistor T11 may be calculated. In this case, the calculated threshold voltage Vth may be referred to as the initial threshold voltage (referred to as Vth).

After using the display device DD-1 for a predetermined time, the current Ia may be calculated by capturing the pixel PXAij to obtain the luminance La. By substituting the current Ia into the current Ied of Equation 2, the threshold voltage Vth of the first transistor T11 may be calculated. In this case, the calculated threshold voltage Vth may be referred to as a current initial threshold voltage (referred to as CVth). A difference between the current threshold voltage CVth and the initial threshold voltage Vth may be the delta threshold voltage (referred to as DVth).

In an embodiment, the delta threshold voltage DVth may be calculated by the delta threshold voltage calculator 120 illustrated in FIG. 3 based on the initial threshold voltage Vth.

The weight calculator 140 illustrated in FIG. 3 may calculate the weight W in consideration of the initial threshold voltage Vth and the delta threshold voltage DVth calculated by the methods illustrated in FIGS. 15, 16A, 16B, and 16C.

In an embodiment, the current Ied flowing through the light emitting diode ED may be directly measured, and the initial threshold voltage Vth and the current threshold voltage CVth may be calculated by Equation 2.

According to an embodiment of the present disclosure, a display device having such a configuration may provide a data signal in which an initial threshold voltage of a first transistor in the pixels and a delta threshold voltage over an operating time are compensated for to pixels. Therefore, it is possible to prevent image quality from being deteriorated even if the threshold voltage of the first transistor is different for each pixel.

While the present disclosure has been described with reference to embodiments thereof, it will be apparent to those of ordinary skill in the art that various changes and modifications may be made thereto without departing from the scope and spirit of the following claims.

What is claimed is:

1. A display device comprising:

a display panel including a pixel;

a driving controller configured to receive an input image signal and output an output image signal; and a data driving circuit configured to provide a data signal corresponding to the output image signal to the pixel, and wherein the pixel includes a light emitting device and a first transistor electrically connected to the light emitting device, and wherein the driving controller includes:

an initial threshold voltage map configured to store an initial threshold voltage of the first transistor;

a delta threshold voltage calculator configured to calculate a delta threshold voltage of the first transistor over an operating time based on the initial threshold voltage;

a weight calculator configured to calculate a weight based on the initial threshold voltage and the delta threshold voltage; and a compensator configured to receive the input image signal and output the output image signal obtained by compensating for a threshold voltage of the first transistor based on the weight, wherein the initial threshold voltage of the first transistor is calculated based on Equation $$\frac{La}{Lb} = \frac{\eta_a \times I_a}{\eta_b \times I_b} = \frac{(a\text{V}data - \text{V}INT - \text{V}kb - \text{V}th)^2}{(b\text{V}data - \text{V}INT - \text{V}kb - \text{V}th)^2}$$

wherein La denotes a first luminance of an image corresponding to a first grayscale, $\eta_a$ denotes a first luminous efficacy of the pixel corresponding to the first grayscale, and Ia denotes a current flowing through the light emitting device corresponding to the first grayscale, a Vdata denotes a first voltage of the data signal corresponding to the first grayscale, Lb denotes a second luminance of the image corresponding to a second grayscale, $\eta_b$ denotes a second luminous efficacy of the image corresponding to the second grayscale, Ib denotes a current flowing through the light emitting device corresponding to the second grayscale, bVdata denotes a second voltage of the data signal corresponding to the second grayscale, VINT denotes a initialization voltage for initializing the light emitting device, Vkb denotes a kickback voltage depending on a position of the pixel, and Vth denotes the initial threshold voltage of the first transistor.

2. The display device of claim 1, wherein the display panel further includes a dummy pixel, and wherein the driving circuit further includes a feedback threshold voltage calculator configured to receive a sensing signal from the dummy pixel and calculate a feedback threshold voltage based on the sensing signal.

3. The display device of claim 2, wherein the delta threshold voltage calculator is configured to calculate the delta threshold voltage based on the initial threshold voltage and the feedback threshold voltage.

4. The display device of claim 2, wherein the feedback threshold voltage calculator is configured to periodically receive the sensing signal from the dummy pixel, and wherein the delta threshold voltage calculator is configured to periodically calculate the delta threshold voltage based on the initial threshold voltage and the feedback threshold voltage.

5. The display device of claim 2, wherein the display panel includes a display area in which the pixel is disposed and a non-display area in which the dummy pixel is disposed.

6. The display device of claim 1, wherein the initial threshold voltage of the first transistor is based on a voltage level of a second electrode of the first transistor when the data signal is provided to a gate electrode of the first transistor and a first driving voltage is provided to a first electrode of the first transistor.

7. The display device of claim 1, wherein the first grayscale and the second grayscale are selected from among a plurality of grayscales such that the first luminous efficacy and the second luminous efficacy are substantially the same.

8. A display device comprising:

a display panel including a pixel;

a driving controller configured to receive an input image signal and output an output image signal; and a data driving circuit configured to provide a data signal corresponding to the output image signal to the pixel, and wherein the pixel includes a light emitting device and a first transistor electrically connected to the light emitting device, and wherein the driving controller includes:

an initial threshold voltage map configured to store an initial threshold voltage of the first transistor;

a delta threshold voltage calculator configured to calculate a delta threshold voltage of the first transistor over an operating time based on the initial threshold voltage;

a weight calculator configured to calculate a weight based on the initial threshold voltage and the delta threshold voltage; and a compensator configured to receive the input image signal and output the output image signal obtained by compensating for a threshold voltage of the first transistor based on the weight, wherein the pixel further includes:

a second transistor connected between a data line and a gate electrode of the first transistor;

a third transistor connected between a first driving voltage line and a first electrode of the first transistor;

a capacitor having a first electrode connected to the gate electrode of the first transistor and a second electrode connected to a second electrode of the first transistor; and a fourth transistor connected between the second electrode of the capacitor and a second driving voltage line.

9. The display device of claim 8, wherein, when the second transistor, the third transistor, and the fourth transistor are all turned on and the data signal is provided through the data line, the initial threshold voltage of the first transistor is detected based on a voltage of the second driving voltage line.

10. A display device comprising:

a display panel including a pixel;

a driving controller configured to receive an input image signal and output an output image signal; and a data driving circuit configured to provide a data signal corresponding to the output image signal to the pixel, and wherein the pixel includes a light emitting device and a first transistor electrically connected to the light emitting device, and wherein the driving controller includes:

an initial threshold voltage map configured to store an initial threshold voltage of the first transistor;

a delta threshold voltage calculator configured to calculate a delta threshold voltage of the first transistor over an operating time based on the initial threshold voltage;

a weight calculator configured to calculate a weight based on the initial threshold voltage and the delta threshold voltage; and a compensator configured to receive the input image signal and output the output image signal obtained by compensating for a threshold voltage of the first transistor based on the weight, wherein the pixel further includes:

a second transistor connected between a gate electrode of the first transistor and an initialization voltage line;

a third transistor connected between an anode of the light emitting device and the initialization voltage line;

a fourth transistor connected between a first driving voltage line and a first electrode of the first transistor; and a fifth transistor connected between a second electrode of the first transistor and the anode of the light emitting device.

11. The display device of claim 10, wherein, in a first period, when the second transistor is turned on, an initialization voltage from the initialization voltage line is provided to the gate electrode of the first transistor;

wherein, in a second period, when the third transistor is turned on, the initialization voltage from the initialization voltage line is provided to the anode of the light emitting device; and wherein, in a third period, when the fourth transistor and the fifth transistor are turned on, a current is provided to the light emitting device.

12. The display device of claim 11, wherein the initial threshold voltage of the first transistor is based on a luminance of the pixel in the third period.

13. A method of operating a display device, the method comprising:

calculating a delta threshold voltage of a first transistor based on an initial threshold voltage and an operating time of the first transistor in a pixel;

calculating a weight based on the initial threshold voltage and the delta threshold voltage; and receiving an input image signal and outputting an output image signal obtained by compensating for a threshold voltage of the first transistor based on the weight, wherein the pixel includes a light emitting device electrically connected to the first transistor, and wherein the initial threshold voltage of the first transistor is calculated based on Equation $$\frac{La}{Lb} = \frac{\eta_a \times I_a}{\eta_b \times I_b} = \frac{(aVdata - VINT - Vkb - Vth)^2}{(bVdata - VINT - Vkb - Vth)^2}$$

wherein La denotes a first luminance of an image corresponding to a first grayscale, $\eta_a$ denotes a first luminous efficacy of the pixel corresponding to the first grayscale, and Ia denotes a current flowing through the light emitting device corresponding to the first grayscale, a Vdata denotes a first voltage of a data signal corresponding to the first grayscale, Lb denotes a second luminance of the image corresponding to a second grayscale, $\eta_b$ denotes a second luminous efficacy of the image corresponding to the second grayscale, Ib denotes a current flowing through the light emitting device corresponding to the second grayscale, bVdata denotes a second voltage of the data signal corresponding to the second grayscale, VINT denotes a initialization voltage for initializing the light emitting device, Vkb denotes a kickback voltage depending on a position of the pixel, and Vth denotes the initial threshold voltage of the pixel.

14. The method of claim 13, further comprising:

receiving a sensing signal from a dummy pixel and calculating a feedback threshold voltage based on the sensing signal.

15. The method of claim 14, wherein the calculating of the delta threshold voltage includes calculating the delta threshold voltage based on the initial threshold voltage and the feedback threshold voltage.

16. The method of claim 13, wherein the initial threshold voltage of the first transistor is based on a voltage level of a second electrode of the first transistor when the data signal is provided to a gate electrode of the first transistor and a first driving voltage is provided to a first electrode of the first transistor.

17. The method of claim 13, wherein the first grayscale and the second grayscale are selected from among a plurality of grayscales such that the first luminous efficacy and the second luminous efficacy are substantially the same.

* * * * *